(12) United States Patent
Saito et al.

(10) Patent No.: US 10,090,791 B2
(45) Date of Patent: Oct. 2, 2018

(54) MACHINE LEARNING APPARATUS AND METHOD FOR LEARNING CORRECTION VALUE IN MOTOR CURRENT CONTROL, CORRECTION VALUE COMPUTATION APPARATUS INCLUDING MACHINE LEARNING APPARATUS AND MOTOR DRIVING APPARATUS

(71) Applicant: FANUC CORPORATION, Yamanashi (JP)

(72) Inventors: Sou Saito, Yamanashi (JP); Taku Sasaki, Yamanashi (JP); Tsutomu Shikagawa, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 16 days.

(21) Appl. No.: 15/290,253

(22) Filed: Oct. 11, 2016

(65) Prior Publication Data
US 2017/0111000 A1 Apr. 20, 2017

(30) Foreign Application Priority Data
Oct. 19, 2015 (JP) ................. 2015-205583

(51) Int. Cl.
*H02P 23/14* (2006.01)
*H02P 29/60* (2016.01)
(Continued)

(52) U.S. Cl.
CPC .......... *H02P 23/14* (2013.01); *G05B 13/0265* (2013.01); *H02P 23/0018* (2013.01); *H02P 27/06* (2013.01); *H02P 29/60* (2016.02)

(58) Field of Classification Search
CPC . G05B 13/0265; H02P 23/0018; H02P 23/14; H02P 27/06; H02P 29/60
See application file for complete search history.

(56) References Cited

U.S. PATENT DOCUMENTS

| 2003/0076065 A1* | 4/2003 | Shafer ................. B62D 5/0496 318/567 |
|---|---|---|
| 2004/0169488 A1* | 9/2004 | Maeda .............. H02M 7/53873 318/801 |

(Continued)

FOREIGN PATENT DOCUMENTS

| JP | 3236449 B2 | 12/2001 |
|---|---|---|
| JP | 2002-10685 A | 1/2002 |

(Continued)

*Primary Examiner* — Muhammad S Islam
(74) *Attorney, Agent, or Firm* — Hauptman Ham, LLP

(57) ABSTRACT

A machine learning apparatus includes: a state observation unit that observes a state variable including an error between a position command and an actual position of a rotor, temperature of a motor driving apparatus and the motor, and voltage of each part of the motor driving apparatus; and a learning unit that learns a current feedback offset correction value for correcting an offset in the current feedback value, an inter-current-feedback-phase unbalance correction value for correcting an unbalance between phases in the current feedback value, and a current command correction value for a dead zone for correcting a current command in order to compensate a decreased amount of current due to a dead zone by which switching elements of upper and lower arms in the same phase of an inverter for motor power supply are not simultaneously turned on, in accordance with a training data set defined by the state variable.

11 Claims, 9 Drawing Sheets

(51) Int. Cl.
*G05B 13/02* (2006.01)
*H02P 27/06* (2006.01)
*H02P 23/00* (2016.01)

(56) References Cited

U.S. PATENT DOCUMENTS

| | | | |
|---|---|---|---|
| 2006/0049784 A1* | 3/2006 | Suzuki | B62D 5/046 |
| | | | 318/400.3 |
| 2007/0176575 A1* | 8/2007 | Nawa | H02M 7/53875 |
| | | | 318/800 |
| 2009/0009113 A1* | 1/2009 | Rodriguez | H02P 6/085 |
| | | | 318/400.15 |
| 2011/0257910 A1* | 10/2011 | Sheahan | G01K 7/16 |
| | | | 702/58 |
| 2011/0264331 A1* | 10/2011 | Imamura | B62D 5/046 |
| | | | 701/42 |
| 2013/0009587 A1* | 1/2013 | Yabuguchi | H02P 27/08 |
| | | | 318/561 |
| 2013/0066524 A1* | 3/2013 | Kitazume | B62D 5/0463 |
| | | | 701/42 |
| 2013/0134910 A1* | 5/2013 | Iwashita | H02P 3/14 |
| | | | 318/376 |
| 2014/0145665 A1* | 5/2014 | Shouji | B60L 15/025 |
| | | | 318/503 |

FOREIGN PATENT DOCUMENTS

| | | |
|---|---|---|
| JP | 2006-172141 A | 6/2006 |
| JP | 2007-206857 A | 8/2007 |
| JP | 2008-49773 A | 3/2008 |
| JP | 2009-303283 A | 12/2009 |
| JP | 2012-65519 A | 3/2012 |
| JP | 2013-223728 A | 10/2013 |
| JP | 2014-514533 A | 6/2014 |
| JP | 2015-176213 A | 10/2015 |

* cited by examiner

MACHINE LEARNING APPARATUS AND METHOD FOR LEARNING CORRECTION VALUE IN MOTOR CURRENT CONTROL, CORRECTION VALUE COMPUTATION APPARATUS INCLUDING MACHINE LEARNING APPARATUS AND MOTOR DRIVING APPARATUS

RELATED APPLICATIONS

The present application claims priority to Japanese Patent Application Number 2015-205583, filed Oct. 19, 2015, the disclosure of which is hereby incorporated by reference herein in its entirety.

BACKGROUND OF THE INVENTION

1. Field of the Invention

The present invention relates to a machine learning apparatus and method that learn a correction value associated with current control based on a current command and a current feedback value in a motor driving apparatus for a three-phase AC motor, and relates to a correction value computation apparatus including the machine learning apparatus, and a motor driving apparatus

2. Description of the Related Art

Motor driving apparatuses for drive control of a three-phase AC motor used as a driving source of a machine tool may be configured with a position control loop, a speed control loop, and a current control loop in many cases.

FIG. 12 is a block drawing schematically illustrating a configuration of a common motor driving apparatus. In a position control loop, a speed command is generated by a speed command generating unit 231, on the basis of information (position feedback value) regarding a rotor actual position of a motor 204 detected by a position detection unit 241 mounted to a three-phase AC motor (hereinafter, also simply referred to as a "motor") 204, and a position command generated by a position command generating unit (not depicted). In a speed control loop, a current command is generated by a current command generating unit 221 on the basis of information (speed feedback value) regarding rotor speed of the motor 204 detected by a speed detection unit 242 mounted to the motor 204 and a speed command generated by the speed command generating unit 231. In a current control loop, a drive command (for example, PWM control signal) for driving an inverter 202 is generated by a current control unit 211, on the basis of information (current feedback value) regarding current flowing into the motor 204 from the inverter 202 detected by a current detection unit 243, and a current command value generated by a current command generating unit 221. The inverter 202 is, for example, an inverter for motor power supply which converts DC power into AC power by a switching operation of a switching element provided therein, and performs a conversion operation which converts DC power into AC power for driving of the motor 204 by controlling the switching operation of the switching element in the inverter 202 by the received drive command. Since the motor 204 operates with the AC power, serving as driving power, output from the inverter 202, controlling the AC power output from the inverter 202 enables drive control of velocity, torque, or rotor position of the motor 204. Driving the motor 204 causes a moving unit of a machine tool to drive.

In this way, the motor driving apparatus performs current control so that a current command value is equal to a current feedback value detected by the current detection unit.

However, in general, an offset is present in the current detection unit detecting a current feedback value. The offset is unrelated to an operation of a motor, and the offset is an offset amount only related to a current detection unit, and is a noise amount detected even when a motor is in a stop state. This current offset causes torque of a motor to generate a pulsation which changes depending on an electric angle, whereby one torque ripple occurs for each one rotation in an electric angle, and this causes a large error between a rotor position command to a three-phase AC motor and a rotor actual position of the three-phase AC motor. Therefore, it is preferable to perform "offset compensation" which corrects a current feedback value using a current feedback offset correction value.

For example, as described in Japanese Patent Publication No. 3236449, a technique which performs offset compensation in a control method with current feedback to a current command by detecting the actual current value of an AC servo motor is known, the technique obtaining offset data on current feedback by detecting the actual current value of an AC servo motor every time when a voltage command becomes zero; updating a current offset value with a current offset value obtained from the offset data; and feeding back the updated current offset value to the current command to perform the offset compensation.

Normally, a current detection unit detects two-phase actual current (for example, U-phase actual current and V-phase actual current) among U, V, W -phase of three-phase current which flows into a three-phase AC motor from an inverter for motor power supply and outputs the current as a current feedback value. However, in two-phase current feedback value detected by a current detection unit, unbalance occurs between phases due to variation in gain of a current detection element, variation in a current sensing resistor, unbalance of detected gain, a noise, or the like. When current control is performed on the basis of a current feedback value with unbalance between phases, an error between a rotor position command to the three-phase AC motor and a rotor actual position of the three-phase AC motor becomes large. Therefore, it is preferable to remove the unbalance between phases by correcting a current feedback value by using an inter-current-feedback-phase unbalance correction value.

Generally, in a switching operation of switching elements in an inverter for motor power supply, a "switching dead zone" by which switching elements of upper and lower arms in the same phase are not simultaneously turned on (conducted) is provided. Since the switching elements of upper and lower arms are not conducted during time period corresponding to the switching dead zone, current does not flow through the arms. Therefore, current less than a current command actually flow through arms due to existence of the switching dead zone, such that current flows only 9.8 [A] (average value basis) through arms on average value basis in spite of having set a current command to a switching element to, for example, 10 [A]. In order to compensate a decreased amount of current due to a switching dead zone, a countermeasure for adding a current command correction value for a dead zone to the original current command is performed hitherto. For example, when attempting to flow current of 10 [A] through arms, switching operation of a switching element is controlled by using 10.2 [A] which is a "current command after correction" obtained by adding 0.2 [A] as a current command correction value for a dead zone to 10 [A] which is the original current command, so that the current of 10 [A] (average value basis) actually flows through the arms. In this way, a decreased amount of current due to a switching dead zone is compensated by correcting a current command by using a current command correction value for a dead zone.

A motor driving apparatus which drives a three-phase AC motor by performing current control based on a current command and a current feedback value attempts to minimize (optimize the smoothness of a feed) an error between a rotor position command to the three-phase AC motor and a rotor actual position of the three-phase AC motor, by performing correction processing using three correction values of: a current feedback offset correction value used for correcting an offset amount included in the current feedback value; an inter-current-feedback-phase unbalance correction value used for correcting an unbalance between phases in the current feedback value; and a current command correction value for a dead zone used for correcting a current command in order to compensate a decreased amount of current due to a switching dead zone by which switching elements of upper and lower arms in the same phase of an inverter for motor power supply are not simultaneously turned on.

Conventionally, a current feedback offset correction value, an inter-current-feedback-phase unbalance correction value, and a current command correction value for a dead zone are handled as a fixed value (constant value).

However, in practice, a switching dead zone changes with variation of components of a system, ambient air temperature, or the like, and therefore it may not be said that current close to a desired value is caused to flow even when a current command is corrected by using the current command correction value for a dead zone made into a fixed value. A switching dead zone is needed in order not to simultaneously turn on switching elements of upper and lower arms in the same phase of an inverter for motor power supply, but current flowing through switching elements is interrupted during the time corresponding to a switching dead zone, whereby this becomes a factor of generation of an error between a rotor position command and a rotor actual position, and is an obstacle to the improvement of smoothness of a feed.

Hitherto, correction values are independently set without taking the influence between the correction values into account. However, respective correction values have influence on each other in practice, and it is difficult to find out the optimal combination of correction values, and it may not be said that an error between a rotor position command and a rotor actual position is always minimized.

The current feedback offset correction value for minimizing an error between a rotor position command to a three-phase AC motor and a rotor actual position of the three-phase AC motor, the inter-current-feedback-phase unbalance correction value, and the current command correction value for a dead zone depend on temperature in a motor driving apparatus, temperature of the three-phase AC motor, input AC voltage input into the motor driving apparatus, DC link voltage between a rectifier provided in the motor driving apparatus and rectifying the input AC voltage and an inverter for motor power supply, and control voltage used to drive a control apparatus provided in the motor driving apparatus. Therefore, it is preferable to change the current feedback offset correction value, the inter-current-feedback-phase unbalance correction value, and the current command correction value for a dead zone in accordance with changes of the temperature in the motor driving apparatus, the temperature of the three-phase AC motor, and the voltage of each part of the motor driving apparatus, but it is difficult to find out the optimal combination of correction values in real time since these correction values are hitherto taken as fixed values as described above.

SUMMARY OF INVENTION

In view of the problems as described, it is an object of the present invention to provide a machine learning apparatus and method which can easily minimize an error between a rotor position command to a three-phase AC motor and a rotor actual position, a correction value computation apparatus including the machine learning apparatus and a motor driving apparatus.

To achieve the above-described object, in a first aspect, a machine learning apparatus that learns correction values associated with current control based on a current command and a current feedback value in a motor driving apparatus for a three-phase AC motor includes: a state observation unit that observes a state variable including at least one of data regarding an error between a rotor position command to the three-phase AC motor and a rotor actual position of the three-phase AC motor, data regarding temperature in the motor driving apparatus, data regarding temperature of the three-phase AC motor, and data regarding voltage of each part of the motor driving apparatus; and a learning unit that learns a current feedback offset correction value used for correcting an offset amount included in the current feedback value, an inter-current-feedback-phase unbalance correction value used for correcting an unbalance between phases in the current feedback value, and a current command correction value for a dead zone used for correcting a current command in order to compensate a decreased amount of current due to a switching dead zone by which switching elements of upper and lower arms in the same phase of an inverter for motor power supply provided in the motor driving apparatus are not simultaneously turned on, in accordance with a training data set defined by the state variable.

The voltage of each part may include at least one of an input AC voltage input into the motor driving apparatus, DC link voltage between a rectifier provided in the motor driving apparatus and rectifying the input AC voltage and the inverter for motor power supply, and control voltage used to drive a control apparatus provided in the motor driving apparatus.

The learning unit may includes: a reward computation unit that computes a reward on the basis of the error between the rotor position command to the three-phase AC motor and the rotor actual position of the three-phase AC motor; and a function update unit that updates, on the basis of the state variable and the reward, functions for computing the current feedback offset correction value, the inter-current-feedback-phase unbalance correction value, and the current command correction value for a dead zone.

The reward computation unit may increase the reward when the error between the rotor position command to the three-phase AC motor and the rotor actual position of the three-phase AC motor is smaller than an error observed by the state observation unit before the current error, and the reward computation unit may decrease the reward when the error is larger than the error observed before.

The reward computation unit may increase the reward when the error between the rotor position command to the three-phase AC motor and the rotor actual position of the three-phase AC motor is within a specified range, and the reward computation unit may decrease the reward when the error is outside the specified range.

The reward computation unit may compute the reward on the basis of a result obtained by performing fast fourier transform on the error between the rotor position command to the three-phase AC motor and the rotor actual position of the three-phase AC motor.

The function update unit may update functions for computing the current feedback offset correction value, the inter-current-feedback-phase unbalance correction value, and the current command correction value for a dead zone, on the basis of the reward and the error between the rotor position command and the rotor actual position on which the fast fourier transform is performed.

The function update unit may update the functions for computing the current feedback offset correction value, the inter-current-feedback-phase unbalance correction value, and the current command correction value for a dead zone, on the basis of the state variable and the reward in accordance with a neural network model.

The learning unit may be configured to learn the current feedback offset correction value, the inter-current-feedback-phase unbalance correction value, and the current command correction value for a dead zone in accordance with the training data set obtained for a plurality of motor control apparatuses.

A correction value computation apparatus that includes the machine learning apparatus according to the first aspect described above and is for current control in a motor driving apparatus, further includes: a decision-making unit which decides the current feedback offset correction value, the inter-current-feedback-phase unbalance correction value, and the current command correction value for a dead zone, on the basis of a result of learning by the learning unit in accordance with the training data set in response to an input of the present state variable.

A motor driving apparatus including the above-described correction value computation apparatus further includes: a rectifier which rectifies input AC voltage input from an AC power supply side, and outputs DC voltage to the DC link side; the inverter for motor power supply which is connected to the rectifier through the DC link, and converts the DC voltage on the DC link side into AC voltage by ON/OFF driving of an internal switching element to output the AC voltage to the three-phase AC motor side; a current detection unit which detects current flowing into the three-phase AC motor from the inverter for motor power supply to output the current as the current feedback value; a current feedback offset correction unit which corrects the offset amount included in the current feedback value using the current feedback offset correction value; an inter-current-feedback-phase unbalance correction unit which corrects the unbalance between phases in the current feedback value using the inter-current-feedback-phase unbalance correction value; a current command correction unit for a dead zone which corrects the current command so as to compensate a decreased amount of current due to a switching dead zone by which switching elements of upper and lower arms in the same phase of the inverter for motor power supply are not simultaneously turned on, by using the current command correction value for a dead zone; a position detection unit which detects the rotor actual position of the three-phase AC motor; an error measuring unit which measures the error between the rotor position command to the three-phase AC motor and the rotor actual position; a motor-driving-apparatus temperature measuring unit which measures the temperature in the motor driving apparatus; a motor temperature measuring unit which measures the temperature of the three-phase AC motor; a current control unit which controls a switching operation of the switching elements of the inverter for motor power supply so that the current command is equal to the current feedback value; and a voltage detection unit which detects at least one of the input AC voltage input into the motor driving apparatus, the DC link voltage between the rectifier and the inverter for motor power supply, and the control voltage used to drive a control device including the current control unit provided in the motor driving apparatus.

In a first aspect, a machine learning method that learns correction values associated with current control based on a current command and a current feedback value in a motor driving apparatus for a three-phase AC motor includes: a state observation step of observing a state variable including at least one of data regarding an error between a rotor position command to the three-phase AC motor and a rotor actual position of the three-phase AC motor, data regarding temperature in the motor driving apparatus, data regarding temperature of the three-phase AC motor, and data regarding voltage of each part of the motor driving apparatus; and a learning step of learning a current feedback offset correction value used for correcting an offset amount included in the current feedback value, an inter-current-feedback-phase unbalance correction value used for correcting an unbalance between phases in the current feedback value, and a current command correction value for a dead zone used for correcting a current command in order to compensate a decreased amount of current due to a switching dead zone by which switching elements of upper and lower arms in the same phase of an inverter for motor power supply provided in the motor driving apparatus are not simultaneously turned on, in accordance with a training data set defined by the state variable.

In a second aspect, a machine learning apparatus that learns correction values associated with current control based on a current command and a current feedback value in a motor driving apparatus for a three-phase AC motor includes: a state observation unit that observes a state variable constituted by at least one of data regarding an error between a rotor position command to the three-phase AC motor and a rotor actual position of the three-phase AC motor, data regarding temperature in the motor driving apparatus, data regarding temperature of the three-phase AC motor, and data regarding voltage of each part of the motor driving apparatus; and a learning unit that learns a current feedback offset correction value used for correcting an offset amount included in the current feedback value, an inter-current-feedback-phase unbalance correction value used for correcting an unbalance between phases in the current feedback value, and a time width correction value for a dead zone used for correcting time width corresponding to a switching dead zone by which switching elements of upper and lower arms in the same phase of an inverter for motor power supply provided in the motor driving apparatus are not simultaneously turned on, in accordance with a training data set defined by the state variable.

The voltage of each part may include at least one of input AC voltage input into the motor driving apparatus, DC link voltage between a rectifier provided in the motor driving apparatus and rectifying the input AC voltage and the inverter for motor power supply, and control voltage used to drive a control apparatus provided in the motor driving apparatus.

A motor driving apparatus including the machine learning apparatus according the above-described first aspect further includes: a decision-making unit which decides the current feedback offset correction value, the inter-current-feedbackphase unbalance correction value, and the time width correction value for a dead zone, on the basis of a result of learning by the learning unit in accordance with the training data set in response to an input of the present state variable; the rectifier which rectifies the input AC voltage input from an AC power supply side, and outputs DC voltage to the DC link side; the inverter for motor power supply which is connected to the rectifier through the DC link, and converts the DC voltage on the DC link side into AC voltage by ON/OFF driving of an internal switching element to output the AC voltage to the three-phase AC motor side; a current detection unit which detects current flowing into the three-phase AC motor from the inverter for motor power supply to output the current as the current feedback value; a current feedback offset correction unit which corrects the offset amount included in the current feedback value using the current feedback offset correction value; an inter-current-feedback-phase unbalance correction unit which corrects the unbalance between phases in the current feedback value using the inter-current-feedback-phase unbalance correction value; a time width correction unit for a dead zone which corrects time width corresponding to a switching dead zone by which switching elements of upper and lower arms in the same phase of the inverter for motor power supply are not simultaneously turned on, by using the current command correction value for a dead zone; a position detection unit which detects the rotor actual position of the three-phase AC motor; an error measuring unit which measures the error between the rotor position command to the three-phase AC motor and the rotor actual position; a motor-driving-apparatus temperature measuring unit which measures the temperature in the motor driving apparatus; a motor temperature measuring unit which measures the temperature of the three-phase AC motor; a current control unit which controls a switching operation of the switching elements of the inverter for motor power supply so that the current command is equal to the current feedback value; and a voltage detection unit which detects at least one of the input AC voltage input into the motor driving apparatus, the DC link voltage between the rectifier and the inverter for motor power supply, and the control voltage used to drive a control device including the current control unit provided in the motor driving apparatus.

BRIEF DESCRIPTION OF THE DRAWINGS

The present invention will be understood more clearly by referring to the following accompanying drawings.

DETAILED DESCRIPTION

A machine learning apparatus and method for learning correction values in motor current control, a correction value computation apparatus and a motor driving apparatus including the machine learning apparatus will be described below with reference to the drawings. It should to be understood that the present invention is not limited to the drawings or embodiments described below.

Figure 1:
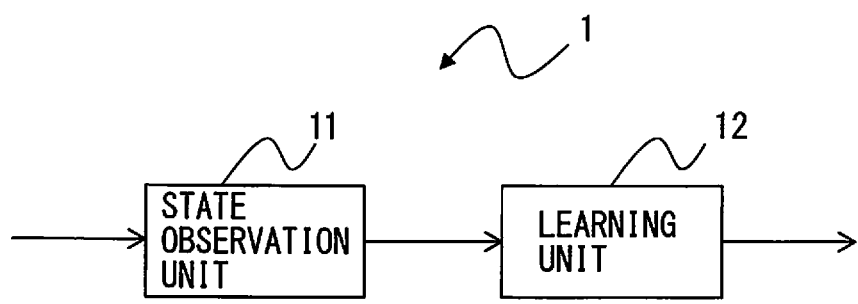
FIG. 1 is a principle block diagram of a machine learning apparatus according to an embodiment.

FIG. 1 is a principle block diagram of a machine learning apparatus according to an embodiment. The same reference numerals in different drawings denote components having the same functions hereinafter.

A machine learning apparatus 1 according to an embodiment is configured to learn, in current control based on a current command and a current feedback value in a motor driving apparatus for a three-phase AC motor, a current feedback offset correction value used for correcting an offset amount included in the current feedback value, an inter-current-feedback-phase unbalance correction value used for correcting an unbalance between phases in the current feedback value, and a current command correction value for a dead zone used for correcting a current command in order to compensate a decreased amount of current due to a switching dead zone by which switching elements of upper and lower arms in the same phase of an inverter for motor power supply provided in the motor driving apparatus are not simultaneously turned on.

The machine learning apparatus 1 includes a state observation unit 11 and a learning unit 12.

The state observation unit 11 observes a state variable constituted by at least one of data regarding an error between a rotor position command to the three-phase AC motor and a rotor actual position of the three-phase AC motor, data regarding temperature in the motor driving apparatus, data regarding temperature of the three-phase AC motor, and data regarding voltage of each part of the motor driving apparatus.

The voltage of each part in the motor driving apparatus observed by the state observation unit 11 includes an input AC voltage input into the motor driving apparatus, DC link voltage between a rectifier provided in the motor driving apparatus and rectifying the input AC voltage, and the inverter for motor power supply, and control voltage used to drive a.control apparatus provided in the motor driving apparatus.

The data regarding the error between the rotor position command to the three-phase AC motor and the rotor actual position of the three-phase AC motor observed by the state observation unit 11 as a state variable is data to be utilized as internal data of control software stored in the control apparatus provided in the motor driving apparatus, and is acquired from the control apparatus. The data regarding the temperature in the motor driving apparatus observed by the state observation unit 11 as a state variable is acquired from a temperature sensor provided as a motor-driving-apparatus temperature measuring unit at an arbitrary part in the motor driving apparatus. The data regarding the temperature of the three-phase AC motor observed by the state observation unit 11 as a state variable is acquired from a temperature sensor provided as a motor temperature measuring unit close to the three-phase AC motor. Data regarding voltage of each part of the motor driving apparatus observed by the state observation unit 11 as a state variable is acquired from each voltage sensor (voltmeter) located at a suitable part for detecting the input AC voltage input into the motor driving apparatus, the DC link voltage between the rectifier and the inverter for motor power supply, and the control voltage used to drive a control apparatus provided in the motor driving apparatus.

The learning unit 12 learns, in accordance with the data set defined by the state variable, the current feedback offset correction value used for correcting an offset amount included in the current feedback value, the inter-current-feedback-phase unbalance correction value used for correcting an unbalance between phases in the current feedback value, and the current command correction value for a dead zone used for correcting a current command in order to compensate a decreased amount of current due to a switching dead zone by which switching elements of upper and lower arms in the same phase of an inverter for motor power supply provided in the motor driving apparatus are not simultaneously turned on. Note that a training data set may be acquired from a plurality of motor driving apparatuses, and in this case, the learning unit 12 learns the current feedback offset correction value, the inter-current-feedback-phase unbalance correction value, and the current command correction value for a dead zone, in accordance with the training data set obtained for a plurality of motor driving apparatuses.

The current feedback offset correction value is used in order to compensate the offset included in the current feedback value detected by the current detection unit as current flowing into the three-phase AC motor from the inverter for motor power supply. The inter-current-feedback-phase unbalance correction value is used in order to remove the unbalance between phases in the current feedback value detected by the current detection unit. The current command correction value for a dead zone is used in order to correct the current command so as to compensate a decreased amount of current due to a switching dead zone by which switching elements of upper and lower arms in the same phase of the inverter for motor power supply are not simultaneously turned on.

Figure 2:
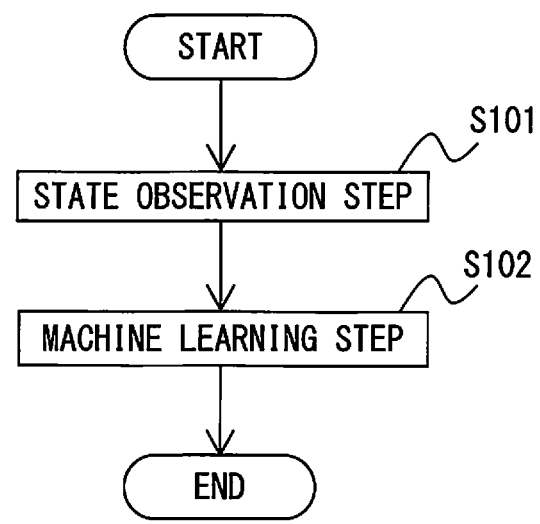
FIG. 2 is a flowchart illustrating an operational flow of a machine learning method according to the embodiment.

FIG. 2 is a flowchart illustrating an operational flow of a machine learning method according to the embodiment. The machine learning method that learns the current feedback offset correction value, the inter-current-feedback-phase unbalance correction value, and the current command correction value for a dead zone in current control based on the current command and the current feedback value in the motor driving apparatus for the three-phase AC motor, includes a state observation step S101 and a learning step S102.

The state observation step S101 is executed by the state observation unit 11, i.e., the state observation unit 11 observes a state variable constituted by at least one of data regarding an error between the rotor position command to the three-phase AC motor and the rotor actual position of the three-phase AC motor, data regarding temperature in the motor driving apparatus, data regarding temperature of the three-phase AC motor, and data regarding voltage of each part of the motor driving apparatus.

The learning step S102 is executed by the learning unit 12, i.e., the learning unit 12 learns the current feedback offset correction value used for correcting an offset amount included in the current feedback value, the inter-current-feedback-phase unbalance correction value used for correcting an unbalance between phases in the current feedback value, and the current command correction value for a dead zone used for correcting a current command in order to compensate a decreased amount of current due to a switching dead zone by which switching elements of upper and lower arms in the same phase of the inverter for motor power supply provided in the motor driving apparatus are not simultaneously turned on, in accordance with the training data set defined by the state variable.

The machine learning apparatus 1 may employ any type of algorithm. The machine learning apparatus 1 has functions of extracting, from a set of data items input into the apparatus by an analysis, a useful rule, knowledge representation, a determination criterion included in the set of data items, outputting the determination result, and learning knowledge. Although there are various techniques, the techniques are generally classified into "supervised learning", "unsupervised learning", and "reinforcement learning". In addition, for implementing these techniques, there is a technique which learns extraction of the feature quantity itself, called "deep learning". Such machine learning (the machine learning apparatus 1) is implemented by applying, for example, GPGPU (General-Purpose computing on Graphics Processing Units), a large-scale PC cluster, or the like.

The application of reinforcement learning will be illustrated with reference to FIG. 3 and FIG. 4 as an example below. The "supervised learning", the "unsupervised learning", or the like are described later.

Figure 3:
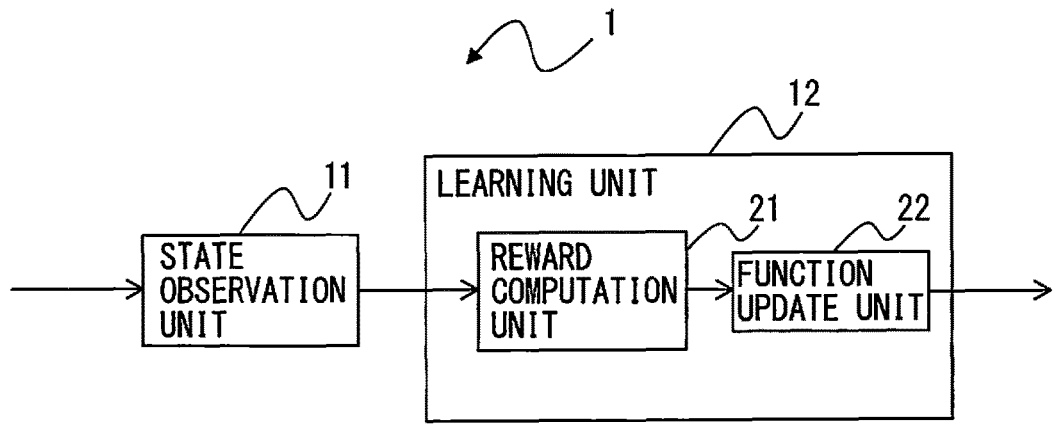
FIG. 3 is a principle block diagram illustrating a machine learning apparatus using reinforcement learning according to the embodiment.

FIG. 3 is a principle block diagram illustrating a machine learning apparatus using reinforcement learning according to the embodiment. The learning unit 12 includes a reward computation unit 21 and a function update unit 22.

The reward computation unit 21 computes a reward on the basis of the error of the rotor position command to the three-phase AC motor and the rotor actual position of the three-phase AC motor. In other words, the reward computation unit 21 gives a higher reward for a smaller error between the rotor position command and the rotor actual position, because the reward computation unit 21 regards that the correction according to the current feedback offset correction value, the inter-current-feedback-phase unbalance correction value, and the current command correction value for a dead zone which are set has a beneficial effect. For example, the reward computation unit 21 can be configured to increase the reward when the error between the rotor position command to the three-phase AC motor and the rotor actual position of the three-phase AC motor is smaller than an error observed by the state observation unit 11 before the present error, and to decrease the reward when the error is larger than the error observed before. Alternatively, for example, the reward computation unit 21 may be configured to increase the reward when the error between the rotor position command to the three-phase AC motor and the rotor actual position of the three-phase AC motor is within a specified range, and to decrease the reward when the error is outside the specified range.

Still alternatively, for example, the reward computation unit 21 can be configured to compute the reward on the basis of a result obtained by performing fast fourier transform (FFT) on the error between the rotor position command to the three-phase AC motor and the rotor actual position of the three-phase AC motor. Hereinafter, reward computation based on the result of fast fourier transform is described. Although description is made for the current feedback offset correction value here, the inter-current-feedback-phase unbalance correction value and the current command correction value for a dead zone are also applicable in a similar way.

When fast fourier transform is performed on the error between the rotor position command and the rotor actual position, the rotation frequency of the three-phase AC motor is expressed by multiples of a fundamental wave component in the obtained result. This multiple component is referred to as a "number-of-times component" herein. For example, when the rotation frequency of the three-phase AC motor is 1 [Hz] (60 [rpm]) and it is assumed that the component of 4 [Hz] is obtained as a result of performing fast fourier transform on the error between the rotor position command and the rotor actual position of the three-phase AC motor, the component can be expressed as a "four times component". Note that since the number-of-times component is a multiple of the fundamental wave component, the frequency of the number-of-times component varies depending on the rotation frequency of the three-phase AC motor.

For example, when the current feedback offset correction value has large influence for decreasing a specific number-of-times component (i.e., for decreasing an error), and when changing the current feedback offset correction value, a reward for error occurrence in the specific number-of-times component is given by weighting more than a reward when an error of a component other than the number-of-times component occurs. For example, when the current feedback offset correction value has large influence for decreasing a four times component, rewards are weighted such that the reward for the four times component is weighted by 10 times and rewards for number-of-times components other than the four times component is weighted by 1 time. For example, when it is unknown which number-of-times component relates to the current feedback offset correction value in decreasing of an error, the current feedback offset correction value may be changed a plurality of times with accumulating the result after fast fourier transform on an error, and a tendency about which number-of-times component decreases is understood to be used as a reference in weighting of rewards.

The function update unit 22 updates functions (an action value table) for computing the current feedback offset correction value, the inter-current-feedback-phase unbalance correction value, and the current command correction value for a dead zone, on the basis of the state variable observed by the state observation unit 11 and the reward computed by the reward computation unit 21. The updating method of functions (action value table) is described below. Since other components are the same as the components illustrated in FIG. 1, the same reference numerals denote the same components, and a detailed description thereof will not be given.

For example, the function update unit 22 may be configured to update functions for computing the current feedback offset correction value, the inter-current-feedback-phase unbalance correction value, and the current command correction value for a dead zone, on the basis of the reward computed by the reward computation unit 21 and the error between the rotor position command and the rotor actual position, on which fast fourier transform is performed.

Figure 10:
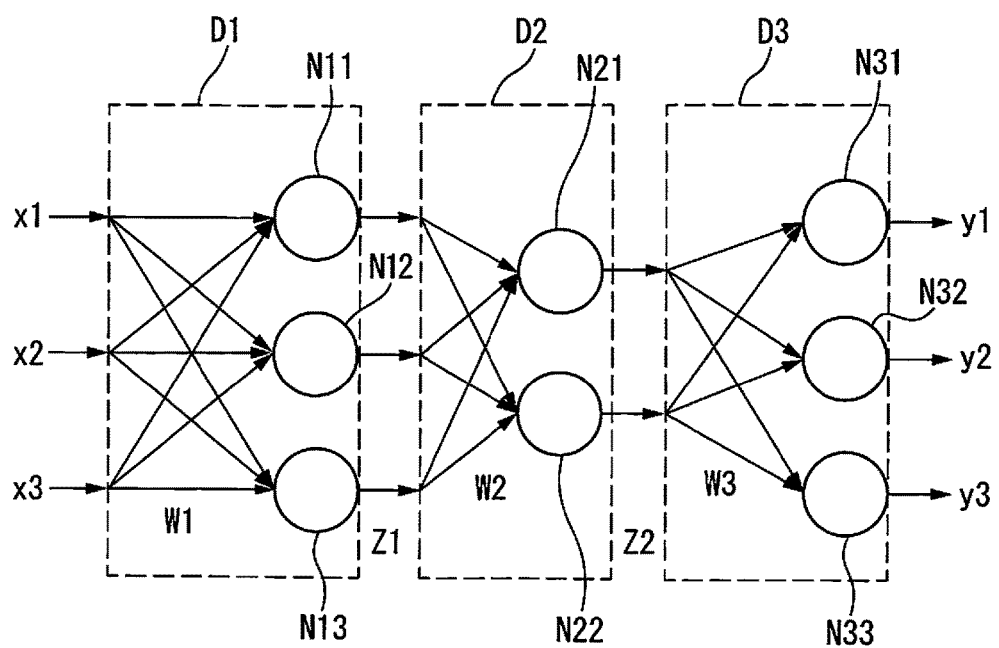
FIG. 10 is an exemplary diagram illustrating a neural network including weights of three layers, D1 to D3.

The learning unit 12 may compute the state variable observed by the state observation unit 11 with a multilayer structure, and update functions (action value table) in real time. For example, the function update unit 22 may update the functions for computing the current feedback offset correction value, the inter-current-feedback-phase unbalance correction value, and the current command correction value for a dead zone, on the basis of the state variable observed by the state observation unit 11 and the reward computed by the reward computation unit 21 in accordance with a neural network model. For example, a multilayer neural network as illustrated in FIG. 10 described below can be used for a method for computing a state variable with the multilayer structure.

Figure 4:
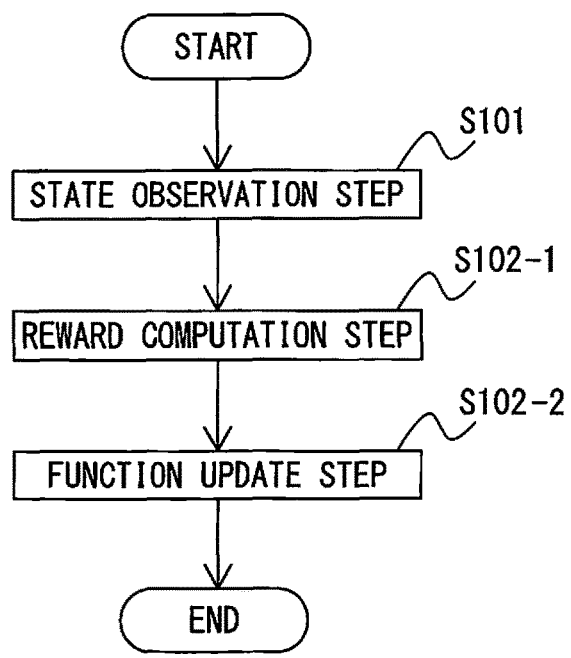
FIG. 4 is a flowchart illustrating an operational flow of a machine learning method using reinforcement learning according to the embodiment.

FIG. 4 is a flowchart illustrating an operational flow of a machine learning method using reinforcement learning according to the embodiment.

First, in state observation step S101, the state observation unit 11 observes a state variable constituted by at least one of data regarding an error between a rotor position command to the three-phase AC motor and a rotor actual position of the three-phase AC motor, data regarding temperature in the motor driving apparatus, data regarding temperature of the three-phase AC motor, and data regarding voltage of each part of the motor driving apparatus.

Subsequently, in reward computation step S102-1, the reward computation unit 21 computes a reward on the basis of the error between the rotor position command to the three-phase AC motor and the rotor actual position of the three-phase AC motor.

Subsequently, in function update step S102-2, the function update unit 22 updates the functions (active value table) for computing the current feedback offset correction value, the inter-current-feedback-phase unbalance correction value, and the current command correction value for a dead zone, on the basis of the state variable observed by the state observation unit 11 and the reward computed by the reward computation unit 21.

Next, a correction value computation apparatus including the above-described machine learning apparatus and a motor driving apparatus including the correction value computation apparatus are described.

Figure 5:
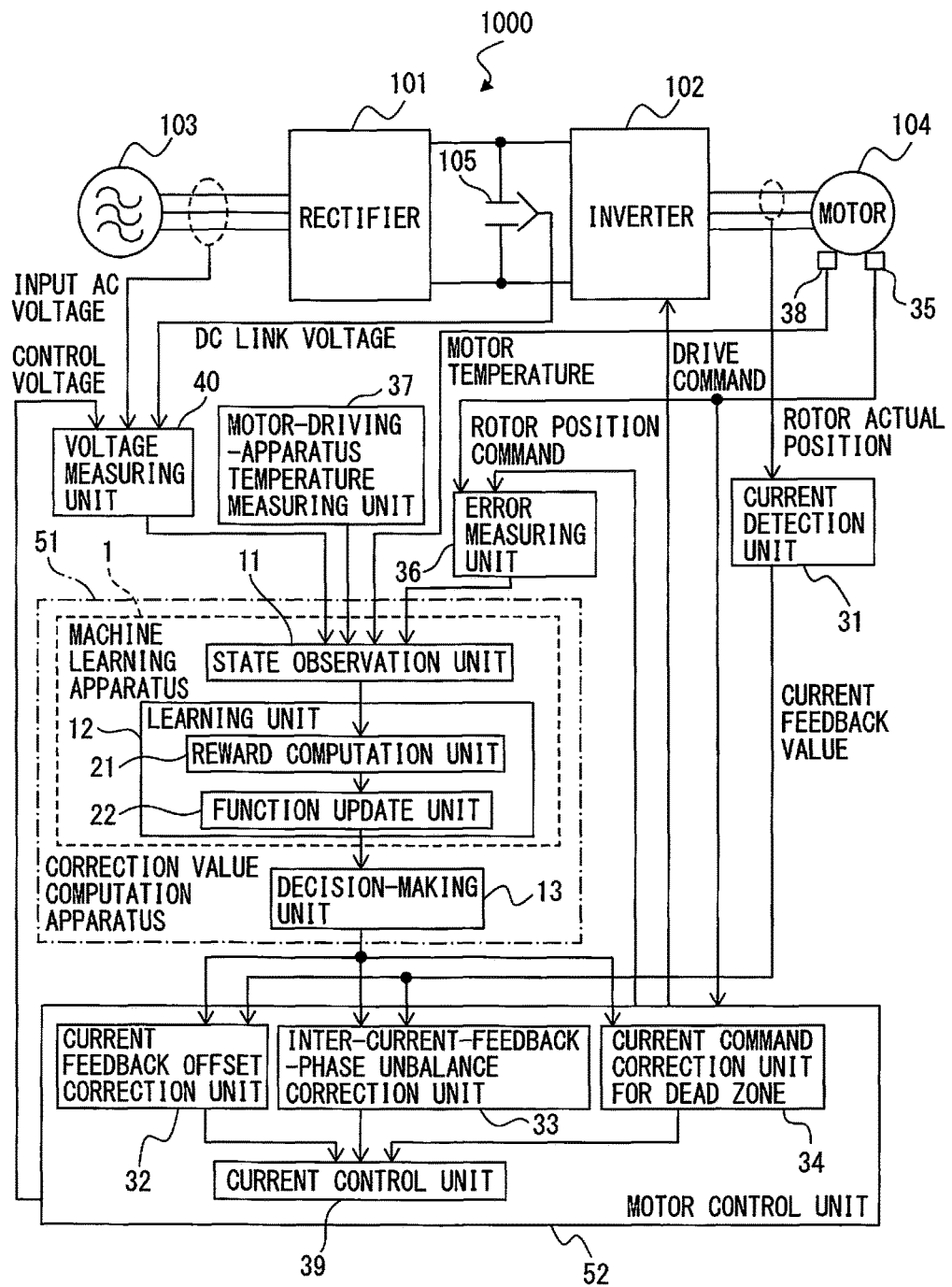
FIG. 5 is a principle block diagram illustrating a correction value computation apparatus including the machine learning apparatus to which reinforcement learning is applied, and a motor driving apparatus including the correction value computation apparatus, according to the embodiment.

FIG. 5 is a principle block diagram illustrating a correction value computation apparatus including the machine learning apparatus to which reinforcement learning is applied, and a motor driving apparatus including the correction value computation apparatus, according to the embodiment. Control of the three-phase AC motor 104 with the motor driving apparatus 1000 is described below.

The motor driving apparatus 1000 includes, as its main circuit configuration, a rectifier 101, an inverter for motor power supply 102, and a DC link capacitor 105. The motor driving apparatus 1000 is connected to the three-phase AC power supply 103 on the AC input side, and the motor driving apparatus 1000 is connected to the three-phase motor 104 on the AC motor side.

The rectifier 101 rectifies input AC voltage input from the AC power supply 103 side and outputs the DC voltage to the DC link side. According to the present invention, the embodiment of the rectifier 101 used is not particularly limited, and examples of the rectifier 101 may include a diode rectifier and a PWM-controlled rectifying circuit.

The inverter for motor power supply 102 is an inverter connected to the DC link on which the DC link capacitor 105 is provided, and converting DC voltage in the DC link into AC voltage by ON/OFF driving of an internal switching element to supply AC current to the three-phase AC motor 104, but in general, the inverter for motor power supply 102 serves as a power converter which allows bidirectional AC/DC conversion. In other words, the inverter for motor power supply 102 allows bidirectional power conversion between DC power in the DC link and AC power serving as drive power or regenerative power for the three-phase AC motor 104, and perform either a regenerative operation (inversion operation) for converting DC voltage into AC voltage or a motoring operation (conversion operation) for converting AC voltage into DC voltage, in response to a drive command received from the motor control unit 52. Specifically, the inverter for motor power supply 102 converts DC power supplied from the DC link side into three-phase AC power having desired voltages and frequencies for causing the internal switching element to perform a switching operation on the basis of the drive command received from the motor control unit 52 to drive the three-phase AC motor 104. The three-phase AC motor 104 thus operates on the basis of the variable-voltage and -frequency three-phase AC power supplied. Regenerative power is generated upon deceleration of the three-phase AC motor 104, and in this case, on the basis of the drive command received from the motor control unit 52, the AC regenerative power generated by the three-phase AC motor 104 is converted into DC power to return the power to the DC link. The inverter for motor power supply 102 is implemented in a three-phase full bridge circuit consisting of a switching element and a diode connected in inverse parallel to it, such as a PWM inverter.

The motor driving apparatus 1000 includes, as its measurement system, a current detection unit 31, a position detection unit 35, an error measuring unit 36, a motor-driving-apparatus temperature measuring unit 37, a motor temperature measuring unit 38, and a voltage measuring unit 40.

The current detection unit 31 detects two-phase actual current (for example, U-phase actual current and V-phase actual current) among U, V, W -phase of three-phase current which flows into the three-phase AC motor 104 from the inverter for motor power supply 102, and outputs the detected current as the current feedback value.

The position detection unit 35 detects the rotor actual position of the three-phase AC motor 104.

The error measuring unit 36 measures the error between the rotor position command to the three-phase AC motor acquired from the motor control unit 52 and the rotor actual position detected by the position detection unit 35.

The motor-driving-apparatus temperature measuring unit 37 is a temperature sensor installed in an arbitrary part in the motor driving apparatus, and measures temperature in the motor driving apparatus 1000. Motor-driving-apparatus temperature measuring units 37 may be installed in a plurality of parts, and may measure temperature of the plurality of parts.

The motor temperature measuring unit 38 is a temperature sensor installed close to the three-phase AC motor 104, and measures temperature of three-phase AC motor 104.

The voltage detection unit 40 measures voltage of each part of the motor driving apparatus 1000. The voltage of each parts includes at least one of the input AC voltage input into the motor driving apparatus 1000, the DC link voltage between the rectifier 101 and the inverter for motor power supply 102, and the control voltage used to drive a control device (motor control unit 52) including the current control unit 39 provided in the motor driving apparatus 1000. Note that, the illustrated example exemplifies a case in which all these input AC voltage, DC link voltage, and control voltage are detected.

The motor driving apparatus 1000 also includes, as its control system, a correction value computation apparatus 51 and a motor control unit 52.

The correction value computation apparatus 51 includes the machine learning apparatus 1 and a decision-making unit 13.

The machine learning apparatus 1 in the correction value computation apparatus 51 includes a state observation unit 11 and a learning unit 12.

The state observation unit 11 observes a state variable constituted by data regarding an error between the rotor position command and the rotor actual position acquired from the error measuring unit 36, data regarding temperature in the motor driving apparatus 1000 acquired from the motor-driving-apparatus temperature measuring unit 37, data regarding temperature of the three-phase AC motor 104 acquired from the motor temperature measuring unit 38, and data regarding voltage of each part of the motor driving apparatus 1000 acquired from the voltage detection unit 40. The observed state variable is used for learning in the learning unit 12 as a training data set.

The reward computation unit 21 in the learning unit 12 computes a reward on the basis of the data regarding the error between the rotor position command and the rotor actual position in the state variable observed by the state observation unit 11. For example, the reward computation unit 21 increases the reward when the error between the rotor position command to the three-phase AC motor 104 and the rotor actual position of the three-phase AC motor 104 is smaller than an error observed by the state observation unit 11 before the present error, and the reward computation unit 21 decreases the reward when the error is larger than the error observed before. Alternatively, for example, the reward computation unit 21 increases the reward when the error between the rotor position command to the three-phase AC motor 104 and the rotor actual position of the three-phase AC motor 104 is within a specified range, and the reward computation unit 21 decreases the reward when the error is outside the specified range.

The function update unit 22 in the learning unit 12 updates the functions (action value table) for computing the current feedback offset correction value, the inter-current-feedback-phase unbalance correction value, and the current command correction value for a dead zone, on the basis of the state variable observed by the state observation unit 11 and the reward computed by the reward computation unit 21.

The decision-making unit 13 in the correction value computation apparatus 51 decides the current feedback offset correction value, the inter-current-feedback-phase unbalance correction value, and the current command correction value for a dead zone in response to input of the present state variable, on the basis of the result of learning by the learning unit 12 in accordance with the training data set. In the present embodiment, since reinforcement learning is used as an exemplary learning algorithm, the function update unit 22 in the learning unit 12 updates functions for changing the current feedback offset correction value, the inter-current-feedback-phase unbalance correction value, and the current command correction value for a dead zone, on the basis of the reward computed by the reward computation unit 21 in the learning unit 12, and the decision-making unit 13 selects, on the basis of the updated functions, a current feedback offset correction value, an inter-current-feedback-phase unbalance correction value, and a current command correction value for a dead zone which achieve the greatest reward. The decision-making unit 13 may be configured to select one or two of, or all of the current feedback offset correction value, the inter-current-feedback-phase unbalance correction value, and the current command correction value for a dead zone, as one or more correction values which achieve the greatest reward.

The motor control unit 52 includes a current feedback offset correction unit 32, an inter-current-feedback-phase unbalance correction unit 33, a current command correction unit for a dead zone 34, and a current control unit 39.

The current feedback offset correction unit 32 in the motor control unit 52 corrects an offset amount included in the current feedback value detected by the current detection unit 31, by using the current feedback offset correction value decided by the decision-making unit 13.

The inter-current-feedback-phase unbalance correction unit 33 in the motor control unit 52 corrects an unbalance between phases in the current feedback value detected by the current detection unit 31, by using the inter-current-feedback-phase unbalance correction value decided by the decision-making unit 13.

The current command correction unit for a dead zone 34 in the motor control unit 52 corrects a current command so as to compensate a decreased amount of the current due to a switching dead zone, by using the current command correction value for a dead zone decided by the decision-making unit 13. In other words, the current command correction value for a dead zone is added to the original current command.

The current control unit 39 in the motor driving apparatus 52 generates the drive command (for example, PWM control signal) for controlling the switching operation of the switching element of the inverter for motor power supply 102 so that the corrected current command is equal to the current feedback value. In response to the generated drive command, the inverter for motor power supply 102 performs the ON/OFF driving in its the switching element, and converts DC voltage in the DC link into AC voltage to supply AC current to the three-phase AC motor 104. The three-phase AC motor 104 operates by using AC power, serving as driving power, output from the inverter for motor power supply 102. Driving the three-phase AC motor 104 causes a moving unit of a machine tool to drive, for example.

In addition to these units, the motor control unit 52 includes: a speed command generating unit which generates a speed command on the basis of the rotor actual position detected by the position detection unit 35 and a position command generated by a position command generating unit; and a current command generating unit which generates a current command on the basis of information (speed feedback value) regarding rotor speed of the three-phase AC motor 104 detected by a speed detection unit mounted to the three-phase AC motor 104 and the speed command generated by the speed command generating unit, but illustration thereof is omitted in FIG. 5.

Figure 6:
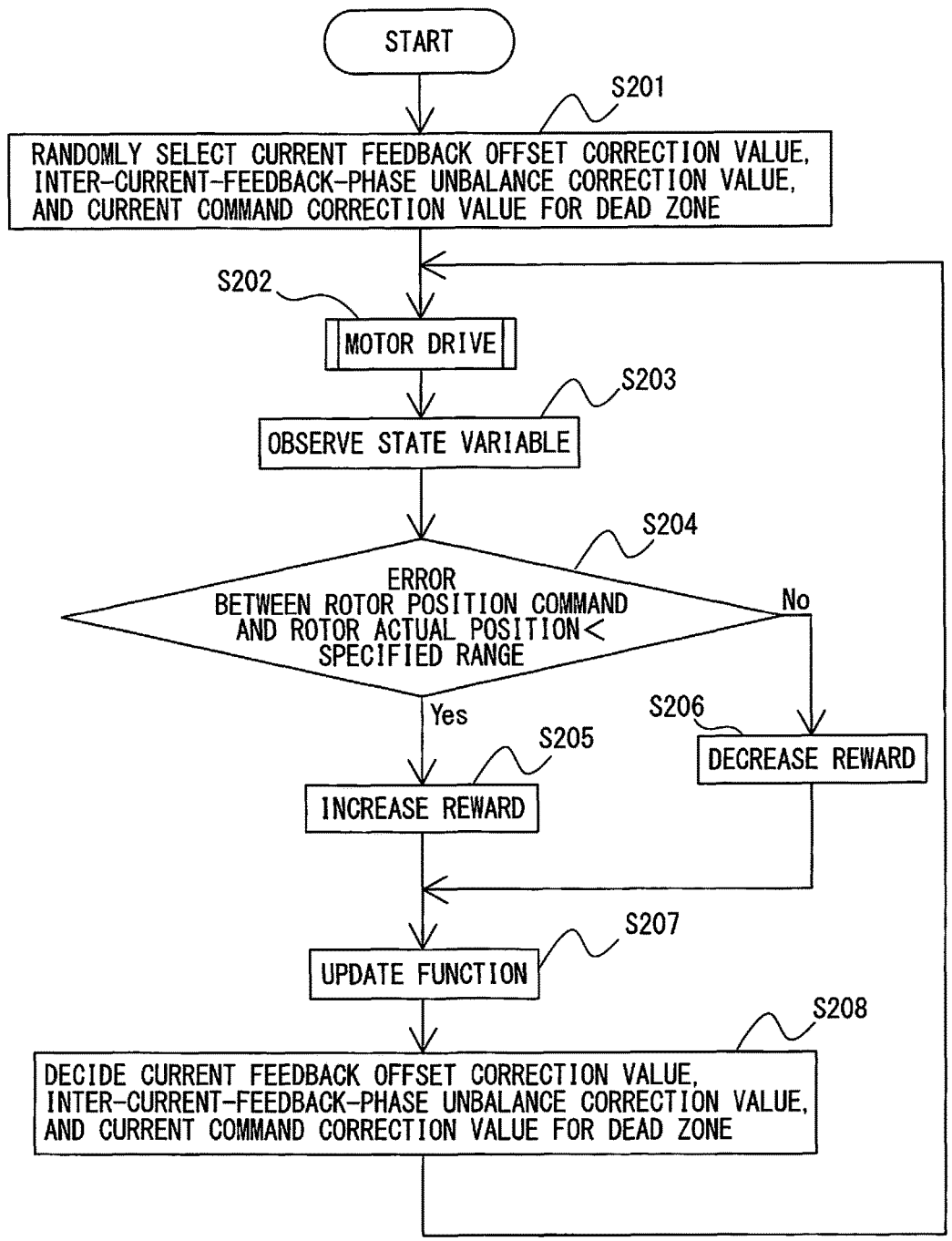
FIG. 6 is a flowchart illustrating an operational flow of the correction value computation apparatus including the machine learning apparatus to which reinforcement learning is applied, and the motor driving apparatus including the correction value computation apparatus, according to the embodiment.

FIG. 6 is a flowchart illustrating an operational flow of the correction value computation apparatus including the machine learning apparatus to which reinforcement learning is applied, and the motor driving apparatus including the correction value computation apparatus, according to the embodiment.

In general, an initial value for the action is randomly selected in reinforcement learning. In the present embodiment, in step S201, a current feedback offset correction value, an inter-current-feedback-phase unbalance correction value, and a current command correction value for a dead zone defined as actions are randomly selected.

In step S202, the current control unit 39 in the motor control unit 52 performs current control based on the current feedback value and the current command which are corrected on the basis of set current feedback offset correction value, inter-current-feedback-phase unbalance correction value, and current command correction value for a dead zone, and issues a command to the inverter for motor power supply 102 to perform either a motoring operation (conversion operation) for converting AC power into DC power or a regeneration operation (inversion operation) for converting DC power into AC power, as a driving command for controlling the velocity, torque, or rotor position of the three-phase AC motor 104, by using, e.g., an operation program for the three-phase AC motor 104, the AC current or voltage on the three-phase AC motor 104 side of the inverter for motor power supply 102, and/or the rotational speed of the three-phase AC motor 104. The three-phase AC motor 104 is thus driven. During this time, the current detection unit 31 detects two-phase actual current (for example, U-phase actual current and V-phase actual current) among U, V, W -phase of three-phase current which flows into the three-phase AC motor 104 from the inverter for motor power supply 102 and outputs the detected current as the current feedback value; the position detection unit 35 detects the rotor actual position of the three-phase AC motor 104; the error measuring unit 36 measures the error between the rotor position command and the rotor actual position; the motor-driving-apparatus temperature measuring unit 37 measures the temperature in the motor driving apparatus 1000; the motor temperature measuring unit 38 measures temperature of the three-phase AC motor 104; and the voltage detection unit 40 detects voltage of each part of the motor driving apparatus 1000 (input AC voltage input into the motor driving apparatus 1000, DC link voltage between the rectifier 101 and the inverter for motor power supply 102, and control voltage used for driving the motor control unit 52 including the current control unit 39 provided in the motor driving apparatus 1000).

In step S203, the state observation unit 11 observes a state variable including the data regarding the error between the rotor position command and the rotor actual position acquired from the error measuring unit 36, the data regarding the temperature in the motor driving apparatus 1000 acquired from the motor-driving-apparatus temperature measuring unit 37, the data regarding the temperature of the three-phase AC motor 104 acquired from the motor temperature measuring unit 38, and the data regarding the voltage of each part of the motor driving apparatus 1000 acquired from the voltage detection unit 40.

In step S204, the state observation unit 11 determines, on the basis of the data regarding the error between the rotor position command and the rotor actual position, whether or not the error is within a specified range. When the state observation unit 11 determines that the error between the rotor position command and the rotor actual position of the three-phase AC motor 104 is within the specified range, the reward computation unit 21 increases a reward in step S205. On the other hand, when the state observation unit 11 determines that the error between the rotor position command and the rotor actual position of the three-phase AC motor 104 is outside the specified range, the reward computation unit 21 decreases the reward in step S206. Note that, in the example illustrated in FIG. 6, the reward computation unit 21 increases the reward when the error between the rotor position command and the rotor actual position of the three-phase AC motor 104 is within the specified range, and decreases the reward when the error is outside the specified range, but as an alternative example, the reward computation unit 21 may increase the reward when the error between the rotor position command to the three-phase AC motor 104 and the rotor actual position of the three-phase AC motor 104 is smaller than an error observed by the state observation unit 11 before the present error, and decreases the reward when the error is larger than the error observed before.

In step S207, the function update unit 22 updates the functions for changing the current feedback offset correction value, the inter-current-feedback-phase unbalance correction value, and the current command correction value for a dead zone, on the basis of the state variable observed by the state observation unit 11 and the reward computed by the reward computation unit 21.

In subsequent step S208, the decision-making unit 13 selects, on the basis of the functions updated in step S207, a current feedback offset correction value, an inter-current-feedback-phase unbalance correction value, and a current command correction value for a dead zone which achieve the greatest reward. The process then returns to step S202, in which the processes in steps S202 to S208 are repeated thereafter. With this operation, the machine learning apparatus 1 learns the current feedback offset correction value, the inter-current-feedback-phase unbalance correction value, and the current command correction value for a dead zone, which are possible to easily minimize the error between the rotor position command to the three-phase AC motor 104 and the rotor actual position. Note that training data sets may be acquired from a plurality of motor driving apparatuses 1000, and in this case, the learning unit 12 repeats the processes in steps S201 to S208 in accordance with the training data sets acquired for the plurality of motor driving apparatuses 1000, to learn the current feedback offset correction value, the inter-current-feedback-phase unbalance correction value, and the current command correction value for a dead zone. Acquired training data sets for the plurality of motor driving apparatuses 1000 improve the learning accuracy of the machine learning apparatus 1.

In the above-described embodiment, the machine learning apparatus 1 is configured to learn the current feedback offset correction value, the inter-current-feedback-phase unbalance correction value, and the current command correction value for a dead zone which are possible to minimize the error between the rotor position command and the rotor actual position, in other word, to improve smoothness of a feed. Among these correction values, the current command correction value for a dead zone is used for correcting the current command so as to compensate a decreased amount of current due to a switching dead zone by which switching elements of upper and lower arms in the same phase of the inverter for motor power supply are not simultaneously turned on. As a modification of the above-described embodiment, the machine learning apparatus 1 may learn, instead of the above-described current command correction value for a dead zone, a time width correction value for a dead zone used for correcting time width corresponding to a switching dead zone by which switching elements of upper and lower arms in the same phase of the inverter for motor power supply provided in the motor driving apparatus are not simultaneously turned on. The time width correction value for a dead zone is a value used in order to adjust the time width corresponding to the switching dead zone. In the present modification, the machine learning apparatus 1 learns the time width correction value for a dead zone which minimize the time width corresponding to the switching dead zone as much as possible but not substantially zero.

As of the machine learning apparatus 1 according to the present modification, a block diagram for illustrating a configuration is substantially the same as the drawings illustrated in FIG. 1 and FIG. 3 described above, a flowchart for illustrating an operational flow is the same as the drawings illustrated in FIG. 2 and FIG. 4 described above, and therefore, illustration thereof is omitted.

Figure 7:
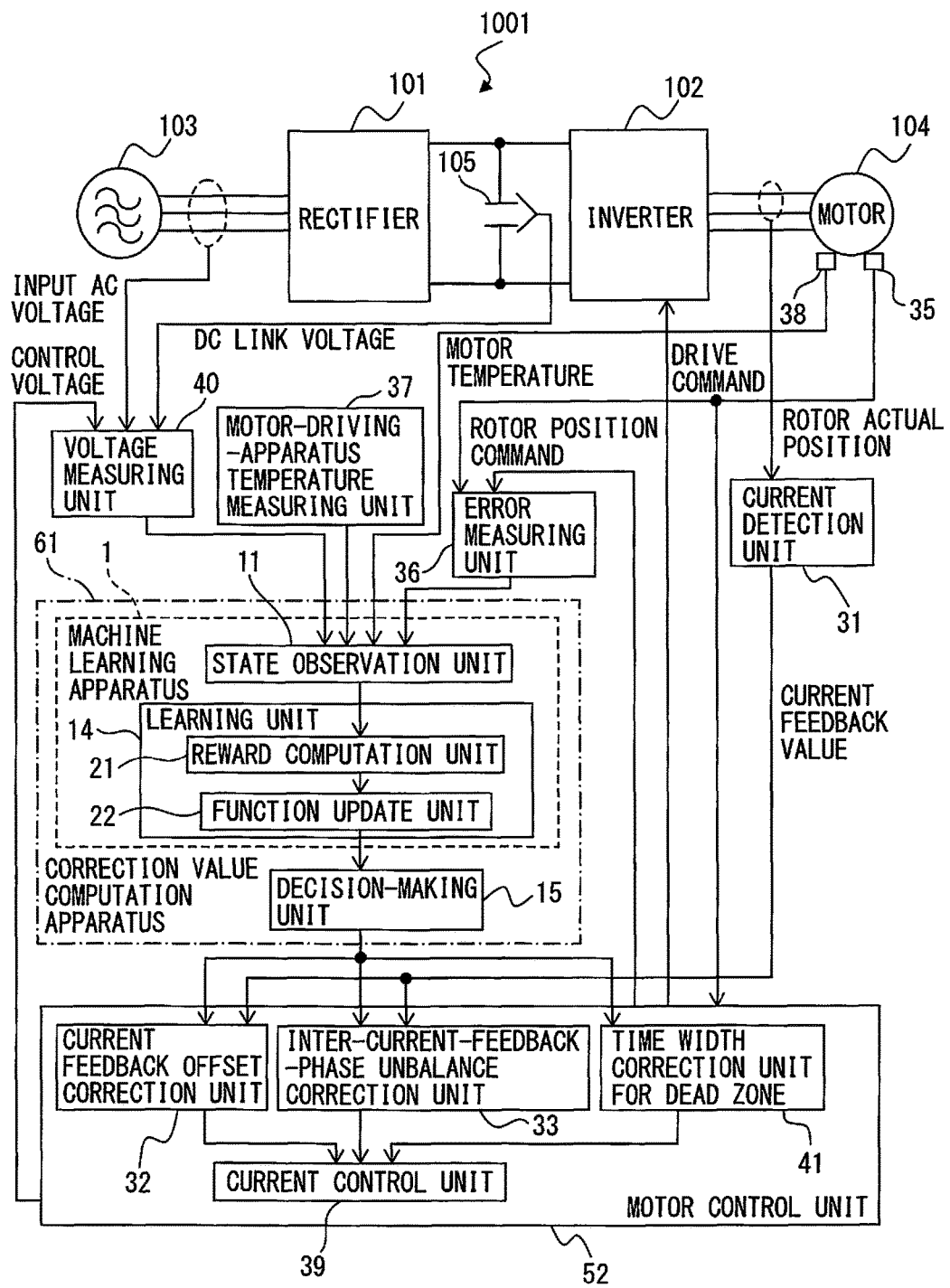
FIG. 7 is a principle block diagram illustrating a motor driving apparatus including a machine learning apparatus according to a modification of the embodiment.

FIG. 7 is a principle block diagram illustrating a motor driving apparatus including the machine learning apparatus according to the modification of the embodiment. In the present modification, control of the three-phase AC motor 104 by the motor driving apparatus 1001 is described.

The motor driving apparatus 1001 according to the preset modification includes, as its main circuit configuration, a rectifier 101, an inverter for motor power supply 102, and a DC link capacitor 105. The motor driving apparatus 1000 is connected to the three-phase AC power supply 103 on the AC input side, and the motor driving apparatus 1000 is connected to the three-phase motor 104 on the AC motor side. These units relating to the main circuit configuration are the same as those in the embodiment illustrated in FIG. 5, and therefore, description thereof is omitted.

The motor driving apparatus 1001 according to the preset modification includes, as its measurement system, a current detection unit 31, a position detection unit 35, an error measuring unit 36, a motor-driving-apparatus temperature measuring unit 37, a motor temperature measuring unit 38, and a voltage measuring unit 40. These units relating to the measurement system are the same as those in the embodiment illustrated in FIG. 5, and therefore, description thereof is omitted.

The motor driving apparatus 1001 includes, as its control system, a correction value computation apparatus 61 and a motor control unit 52. The correction value computation apparatus 61 includes a machine learning apparatus 1 and a decision-making unit 15. The machine learning apparatus 1 in the correction value computation apparatus 61 includes a state observation unit 11 and a learning unit 14.

The state observation unit 11 is the same as that in the embodiment illustrated in FIG. 5, and therefore, description thereof is omitted.

The learning unit 14 learns a current feedback offset correction value used for correcting an offset amount included in the current feedback value, an inter-current-feedback-phase unbalance correction value used for correcting an unbalance between phases in the current feedback value, and a time width correction value for a dead zone used for correcting time width corresponding to a switching dead zone by which switching elements of upper and lower arms in the same phase of an inverter for motor power supply 102 provided in the motor driving apparatus are not simultaneously turned on, in accordance with a training data set defined by the state variable. The learning unit 14 includes a reward computation unit 21 and a function update unit 22, which are the same as those in the embodiment illustrated in FIG. 5, and description thereof is omitted.

The decision-making unit 15 in the correction value computation apparatus 61 decides the current feedback offset correction value, the inter-current-feedback-phase unbalance correction value, and the time width correction value for a dead zone in response to input of the present state variable, on the basis of the result of learning by the learning unit 12 in accordance with the training data set. When employing reinforcement learning as a learning algorithm, on the basis of the reward computed by the reward computation unit 21 in the learning unit 14, the function update unit 22 in the learning unit 14 updates the functions for changing the current feedback offset correction value, the inter-current-feedback-phase unbalance correction value, and the time width correction value for a dead zone, and the decision-making unit 15 selects, on the basis of the updated functions, a current feedback offset correction value, an inter-current-feedback-phase unbalance correction value, and a time width correction value for a dead zone which achieve the greatest reward. The decision-making unit 15 may be configured to select one or two of, or all of the current feedback offset correction value, the inter-current-feedback-phase unbalance correction value, and the time width correction value for a dead zone, as one or more correction values which achieve the greatest reward.

The motor control unit 52 includes a current feedback offset correction unit 32, an inter-current-feedback-phase unbalance correction unit 33, a time width correction unit for a dead zone 41, and a current control unit 39. Among these units, the current feedback offset correction unit 32, the inter-current-feedback-phase unbalance correction unit 33, and the current control unit 39 are the same as those in the embodiment illustrated in FIG. 5, and therefore, description thereof is omitted.

The time width correction unit for a dead zone 41 in the motor control unit 52 corrects time width corresponding to the switching dead zone by which switching elements of upper and lower arms in the same phase of the inverter for motor power supply 102 are not simultaneously turned on, by using the time width correction value for a dead zone.

The current control unit 39 in the motor driving apparatus 52 generates a drive command (for example, PWM control signal) for controlling the switching operation of the switching element of the inverter for motor power supply 102 so that the corrected current command is equal to the current feedback value. As for the switching dead zone used in this process, its time width has been corrected (adjusted) by the time width correction unit for a dead zone 41 using the time width correction value for a dead zone. In response to the generated drive command, the inverter for motor power supply 102 performs the ON/OFF driving in its the switching element, and converts DC voltage in the DC link into AC voltage to supply AC current to the three-phase AC motor 104. The three-phase AC motor 104 operates by using AC power, serving as driving power, output from the inverter for motor power supply 102. Driving the three-phase AC motor 104 causes a moving unit of a machine tool to drive, for example.

In addition to these units, the motor control unit 52 includes a speed command generating unit and a current command generating unit, but illustration thereof is omitted in FIG. 7.

Figure 8:
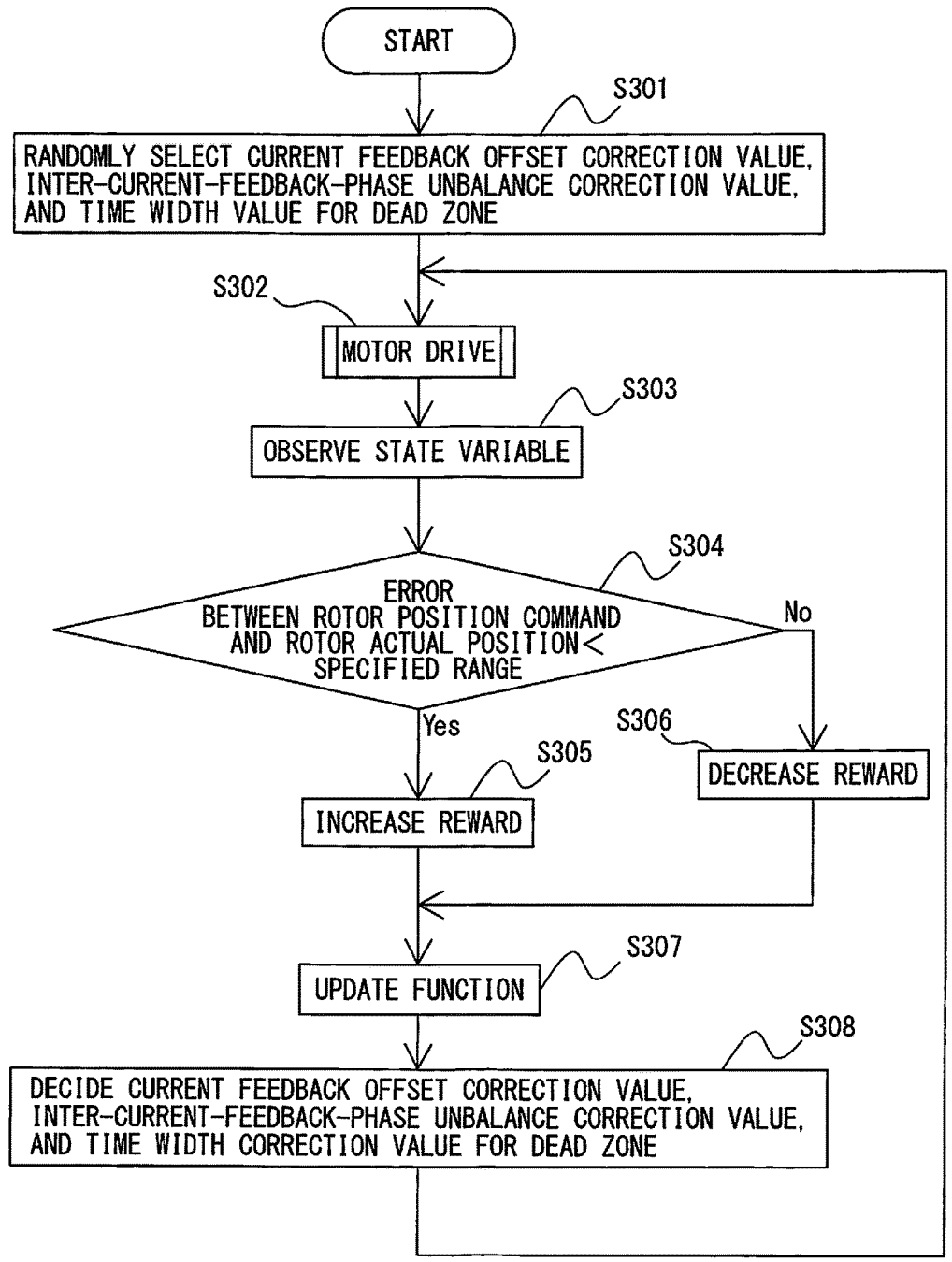
FIG. 8 is a flowchart illustrating an operational flow of the motor driving apparatus including the machine learning apparatus according to the modification of the embodiment.

FIG. 8 is a flowchart illustrating an operational flow of the motor driving apparatus including the machine learning apparatus according to the modification of the embodiment.

In the present modification, in step S301, a current feedback offset correction value, an inter-current-feedback-phase unbalance correction value, and a time width correction value for a dead zone defined as actions are randomly selected.

In step S302, the current control unit 39 in the motor control unit 52 performs current control on the basis of the current feedback value and the current command which are corrected on the basis of set current feedback offset correction value, inter-current-feedback-phase unbalance correction value, and time width correction value for a dead zone, and issues a command to the inverter for motor power supply 102 to perform either a motoring operation (conversion operation) for converting AC power into DC power or a regeneration operation (inversion operation) for converting DC power into AC power, as a driving command for controlling the velocity, torque, or rotor position of the three-phase AC motor 104, using, e.g., an operation program for the three-phase AC motor 104, the AC current or voltage on the three-phase AC motor 104 side of the inverter for motor power supply 102, and/or the rotational speed of the three-phase AC motor 104. The three-phase AC motor 104 is thus driven. An operation of the current detection unit 31, the position detection unit 35, the error measuring unit 36, the motor-driving-apparatus temperature measuring unit 37, the motor temperature measuring unit 38, and the voltage detection unit 40 during this time is as described in relation to step S202 of FIG. 6.

In step S303, the state observation unit 11 observes a state variable including the data regarding the error between the rotor position command and the rotor actual position acquired from the error measuring unit 36, the data regarding the temperature in the motor driving apparatus 1000 acquired from the motor-driving-apparatus temperature measuring unit 37, the data regarding the temperature of the three-phase AC motor 104 acquired from the motor temperature measuring unit 38, and the data regarding the voltage of each part of the motor driving apparatus 1000 acquired from the voltage detection unit 40.

In step S304, the state observation unit 11 determines, on the basis of data regarding the error between the rotor position command and the rotor actual position, whether or not the error is within a specified range. When the state observation unit 11 determines that the error between the rotor position command and the rotor actual position of the three-phase AC motor 104 is within the specified range, the reward computation unit 21 increases a reward in step S305. On the other hand, when the state observation unit 11 determines that the error between the rotor position command and the rotor actual position of the three-phase AC motor 104 is outside the specified range, the reward computation unit 21 decreases the reward in step S306. Note that, in the example illustrated in FIG. 8, the reward computation unit 21 increases the reward when the error between the rotor position command and the rotor actual position of the three-phase AC motor 104 is within the specified range, and decreases the reward when the error is outside the specified range, but as an alternative example, the reward computation unit 21 may increase the reward when the error between the rotor position command to the three-phase AC motor 104 and the rotor actual position of the three-phase AC motor 104 is smaller than an error observed by the state observation unit 11 before the present error, and decreases the reward when the error is larger than the error observed before.

In step S307, the function update unit 22 updates the functions for changing the current feedback offset correction value, the inter-current-feedback-phase unbalance correction value, and the time width correction value for a dead zone, on the basis of the state variable observed by the state observation unit 11 and the reward computed by the reward computation unit 21.

In subsequent step S308, the decision-making unit 15 selects, on the basis of the functions updated in step S307, a current feedback offset correction value, an inter-current-feedback-phase unbalance correction value, and a time width correction value for a dead zone which achieve the greatest reward. The process then returns to step S302, in which the processes in steps S302 to S308 are repeated thereafter. With this operation, the machine learning apparatus 1 learns the current feedback offset correction value, the inter-current-feedback-phase unbalance correction value, and the time width correction value for a dead zone, which are possible to easily minimize the error between the rotor position command to the three-phase AC motor 104 and the rotor actual position. Note that training data sets may be acquired from a plurality of motor driving apparatuses 1001, and in this case, the learning unit 14 repeats the processes in steps S301 to S308 in accordance with the training data sets acquired for the plurality of motor driving apparatuses 1001, to learn the current feedback offset correction value, the inter-current-feedback-phase unbalance correction value, and the time width correction value for a dead zone. Acquired training data sets for the plurality of motor driving apparatuses 1001 improve the learning accuracy of the machine learning apparatus 1.

Next, a learning algorithm in each machine learning apparatus 1 according to the above-described embodiment and its modification is described in detail. The machine learning apparatus 1 has functions of extracting a useful rule, a knowledge representation, a decision criterion and the like by analysis from a set of data items input into the apparatus, outputting the decision result, and learning knowledge. As described above, the learning algorithm in the machine learning apparatus 1, are generally classified into "supervised learning", "unsupervised learning", and "reinforcement learning". In addition, for implementing these techniques, there is a technique which learns extraction of the feature quantity itself, called "deep learning". Such machine learning (the machine learning apparatus 1) is implemented by applying, for example, GPGPU (General-Purpose computing on Graphics Processing Units), a large-scale PC cluster, or the like.

"Supervised learning" provides a pair of a certain input data and a result (label) data to the machine learning apparatus 1 in large quantities to learn the feature in the data sets, and inductively obtains a model for estimating a result from an input, i.e., the relationship. When supervised learning is applied to the present embodiment, supervised learning can be used in components for computing the current feedback offset correction value, the inter-current-feedback-phase unbalance correction value, and the current command correction value for a dead zone. This is implementable using an algorithm such as a neural network described below.

"Unsupervised learning" provides only input data to the machine learning apparatus 1 in large quantities, thereby learning distribution aspects of the input data and learning an apparatus performing compression, classification, shape, or the like on the input data, without providing corresponding supervised output data. For example, unsupervised learning can perform clustering of features in the data sets into sets each having similar feature. Providing a certain criteria and assigning an output which optimize the criteria using the clustering result allows a prediction of an output.

There is an issue between "unsupervised learning" and "supervised learning", called "semi-supervised learning", in which there are only certain pairs of input data and output data and there are only input data with respect to other parts.

In the present embodiment, data (for example, simulation data) acquirable without actually operating the motor driving apparatus is used in unsupervised learning, to thereby achieve efficient learning.

First, an example applying reinforcement learning to the machine learning apparatus 1 as a learning algorithm is described.

Issues in reinforcement learning are considered as follows.

The correction value computation apparatus observes an environmental state and determines action.

Environment may change in accordance with a certain rule, and also own action may cause environment to change.

A reward signal is returned for each action.

The total of the rewards (discounts) over the future is intended to maximize.

Start learning from a state in which a result caused by action is not known at all, or is imperfectly known. In other words, the correction value computation apparatus can obtain a result as data only after actually starting the operation. Also in other words, it is necessary to search for the optimal action by trial and error.

An initial state may be set to a state in which prior learning (technique of above-described supervised learning and inverse reinforcement learning) has been performed so that an operation of human might be imitated, and learning may be started from a better start point.

"Reinforcement learning" is a method which learns not only decisions and classifications but also action, to thereby learn appropriate action taking interaction between environment and action into consideration, i.e., to learn for maximizing the reward to be obtained in the future). This represents that the present embodiment can obtain action which may have influence to the future such that an error between the rotor position command and the rotor actual position is minimized (smoothness of a feed is optimized). For example, description is continued with applying Q learning, but it is not limited to this.

Q learning is a method of learning a value Q (s, a) for selecting of action a under a certain environmental state s. In other words, action a with the highest value Q (s, a) may be selected as the optimal action in a certain state s. However, with respect to the combination of a state s and action a, the true value of the value Q (s, a) is not known at all at first. Then, an agent (action subject) selects various actions a under a certain state s, and receives rewards for actions a at the time. In this way, the agent learns selection of better action, i.e., the true value Q, (s, a).

Further, the total of the rewards to be obtained over the future is intended to maximize as a result of action, and therefore, final goal is that $Q(s, a)=E[\Sigma\gamma^t r_t]$ is established. It is assumed that an expected value is taken when a state changes in accordance with the optimal action, but it is learned while searching since it is not known yet. An update equation of such value Q (s, a) can be represented by Equation 1, for example.

$$Q(s_t, a_t) \leftarrow Q(s_t, a_t) + \alpha\left(r_{t+1} + \gamma\max_a Q(s_{t+1}, a) - Q(s_t, a_t)\right) \quad (1)$$

In above-described Equation 1, $s_t$ denotes a state of environment at time t, and $a_t$ denotes action at time t. A state changes to $s_{t+1}$ by the action $a_t$. $r_{t+1}$ denotes a reward which can be given by the change of the state. The term with "max" corresponds to a value obtained by multiplying Q value by $\gamma$, the Q value being the highest Q value among the known Q values at the time of selecting action a having the highest Q value under the state $s_{t+1}$. $\gamma$ is a parameter which satisfies $0<\gamma\leq1$, and is called a discount rate. $\alpha$ is a learning coefficient and is a value within a range $0<\alpha\leq1$.

Equation 1 represents a method of updating an evaluation value Q ($s_t$, $a_t$) of action $a_t$ in a state $s_t$ on the basis of a reward $r_{t+1}$ returned as a result of a trial $a_t$. The equation represents that, when the evaluation value Q ($s_{t+1}$, max $a_{t+1}$) of the reward $r_{t+1}$+ best action max a in the subsequent state according to the action a is larger than the evaluation value Q ($s_t$, $a_t$) of the action a in the state s, Q ($s_t$, $a_t$) is increased, and when it is smaller on the contrary, Q ($s_t$, $a_t$) is decreased. In other words, a value of a certain action in a certain state is made closer to a reward immediately returned as a result and a value of the best action in the subsequent state according to the action.

The expression modes of Q (s, a) on a computer includes a method of holding the value Q for all the state action pairs (s, a) in a table (action value table), and a method of preparing a function which approximates Q (s, a). In the latter method, the above-described update equation is implementable by adjusting parameters of an approximation function with techniques, such as probability gradient descent. A neural network described below can be used as the approximation function.

Figure 9:
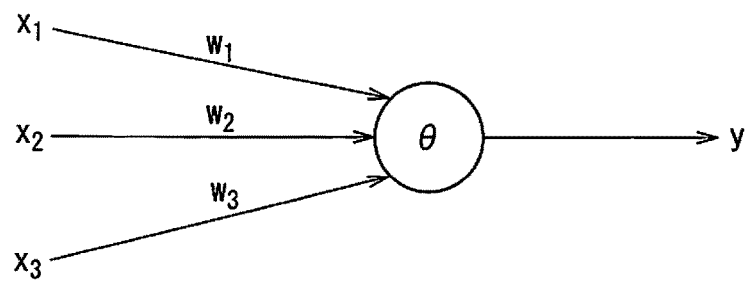
FIG. 9 is an exemplary diagram illustrating a model of a neuron.

A neural network can be used as an approximation algorithm of a value function in supervised learning, unsupervised learning, and reinforcement learning. The neural network includes an arithmetic unit, a memory, and the like, which implement, for example, the neural network corresponding to a model of a neuron as illustrated in FIG. 9. FIG. 9 is an exemplary diagram illustrating a model of a neuron.

As illustrated in FIG. 9, a neuron outputs an output y for a plurality of inputs x (input x1 to input x3 in FIG. 9, as an example). The inputs x1 to x3 are weighted by weights w (w1 to w3) corresponding to the inputs x, respectively. In this way, the neuron outputs the output y expressed by Equation 2. Note that all of inputs x, output y, and weights w are vectors. In the following Equation 2, $\theta$ denotes a bias and $f_k$ denotes an activating function.

$$y=f_k(\Sigma_{i=1}^n x_i w_i - \theta) \quad (2)$$

Next, a neural network including weights of three layers which combines the neuron described above is described with reference to FIG. 10. FIG. 10 is an exemplary diagram illustrating a neural network including weights of three layers, D1 to D3.

As illustrated in FIG. 10, a plurality of inputs x (input x1 to input x3 as an example) are input from the left side of the neural network, and results y (result y 1 to result y3 as an example) are output from the right side.

Specifically, the input x1 to input x3 are weighted by corresponding weights, respectively, and input into each of three neurons N11 to N13. These weights applied to the inputs are collectively referred to as w1.

The neurons N11 to N13 output z11 to z13, respectively. In FIG. 10, these z11 to z13 are collectively referred to as a feature vector z1, which can be regarded as a vector including extracted feature quantity of the input vector. This feature vector z1 is a feature vector between the weight w1 and the weight w2. The z11 to z13 are weighted by corresponding weights, respectively, and input into each of two neurons N21 and N22. These weights applied to the feature vector are collectively referred to as w2.

The neurons N21 and N22 output z21 and z22, respectively. In FIG. 10, these z21 and z22 are collectively referred to as a feature vector z2. This feature vector z2 is a feature vector between the weight w2 and the weight w3. The feature vector z21 and z22 are weighted by corresponding weights, respectively, and input into each of three neurons N31 to N33. These weights applied to the feature vector are collectively referred to as w3.

Finally, the neurons N31 to N33 output results y1 to y3, respectively.

The operation of the neural network includes a learning mode and a value prediction mode. For example, weights w are learned using learning data sets in the learning mode, and an action decision in the correction value computation apparatus is made using a learned parameter in the prediction mode. Although it is written as prediction for convenience, it is needless to say that various tasks, such as detection, classification, and reasoning, are possible.

It may be possible to immediately learn the data obtained by actually operating the correction value computation apparatus in the prediction mode to reflect the data to the subsequent action (online learning), meanwhile it may be possible to perform collective learning using a previously collected data group, and perform a detection mode (batch learning) with the parameters thereafter. Alternatively, as its intermediate aspect, it is also possible to insert a learning mode whenever data accumulates to some extent.

The weights w1 to w3 can be learned by backpropagation. Information on error is input from right side, and flows to left side. The backpropagation is a technique of adjusting (learning) each weight so as to decrease the difference between an output y when an input x is input and a true output y (teacher) for each neuron.

Such a neural network can further increase the number of layers, i.e., to three or more layers (called as deep learning). It is possible to automatically obtain an arithmetic unit which performs feature extraction on an input step by step and returns a result only from supervised data.

The machine learning apparatus 1 of the present embodiment includes, in order to implement above-described Q learning, a state observation unit 11, a learning unit 12, and a decision-making unit 13, for example as illustrated in FIG. 5. However, a machine learning method applied to the present invention is not limited to Q learning as described above. In other words, various techniques, such as "supervised learning", "unsupervised learning", "semi-supervised learning", and "reinforcement learning", which can be used by the machine learning apparatus are applicable. Such machine learning (machine learning apparatus 1) is implementable by applying GPGPU, a large-scale PC cluster or the like, for example. For example, when applying supervised learning, a value function corresponds to a learning model and a reward corresponds to an error. It is also possible to use a function approximated by using the above-described neural network as the action value table, and this is especially effective when s and a have a huge amount of information.

Next, an example applying supervised learning as a learning algorithm in the machine learning apparatus 1 is described. Although the machine learning apparatus 1 illustrated in FIG. 5, which learns the current feedback offset correction value, the inter-current-feedback-phase unbalance correction value, and the current command correction value for a dead zone which minimize the error between the rotor position command and the rotor actual position, i.e., improve smoothness of a feed is described, the same can be applied to the apparatus illustrated in FIG. 7, which learns the time width correction value for a dead zone which minimize the time width corresponding to the switching dead zone as much as possible but not substantially zero.

Figure 11:
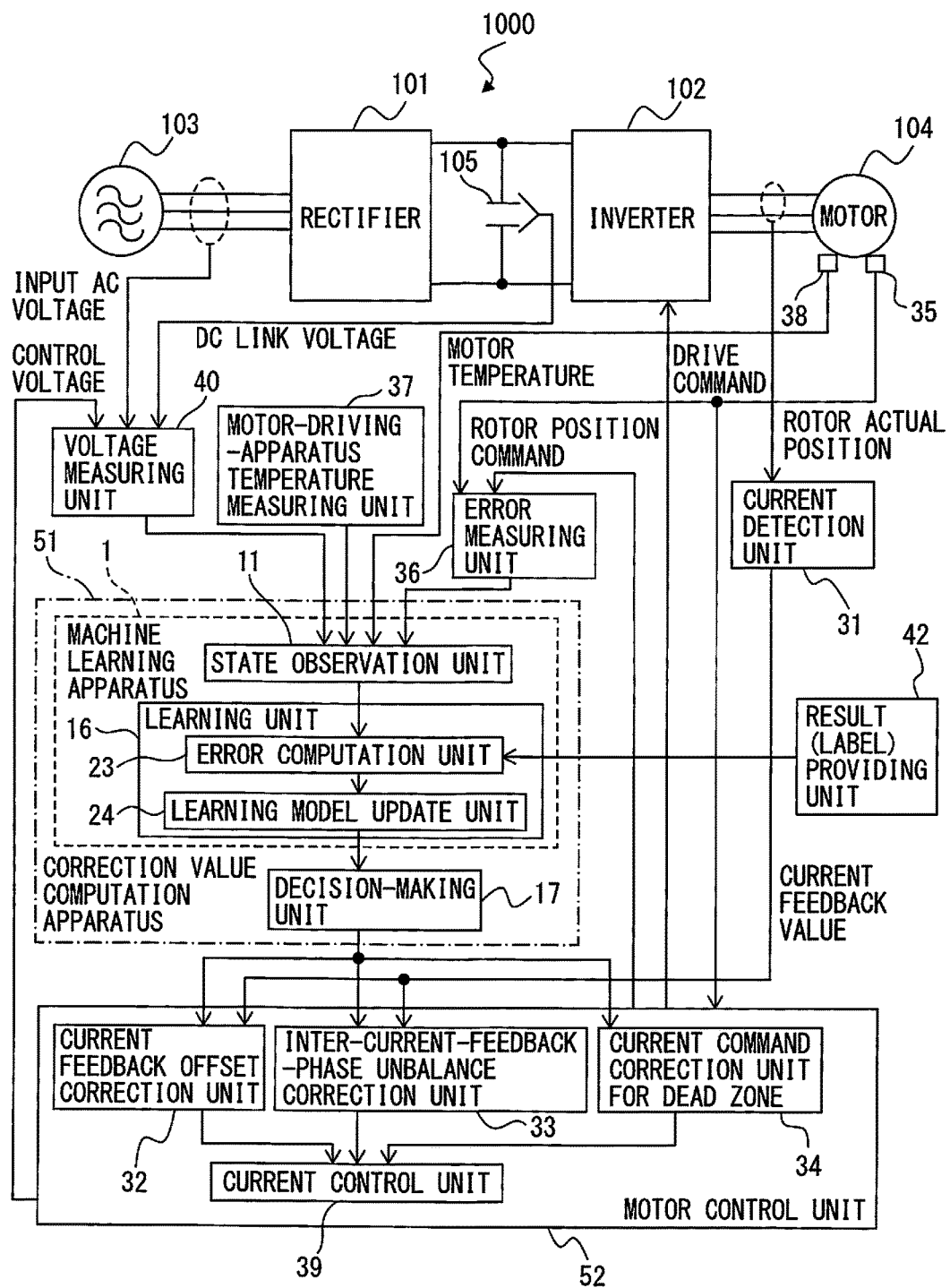
FIG. 11 is a principle block diagram illustrating a correction value computation apparatus including the machine learning apparatus to which supervised learning is applied, and a motor driving apparatus including the correction value computation apparatus, according to the embodiment.
Figure 12:
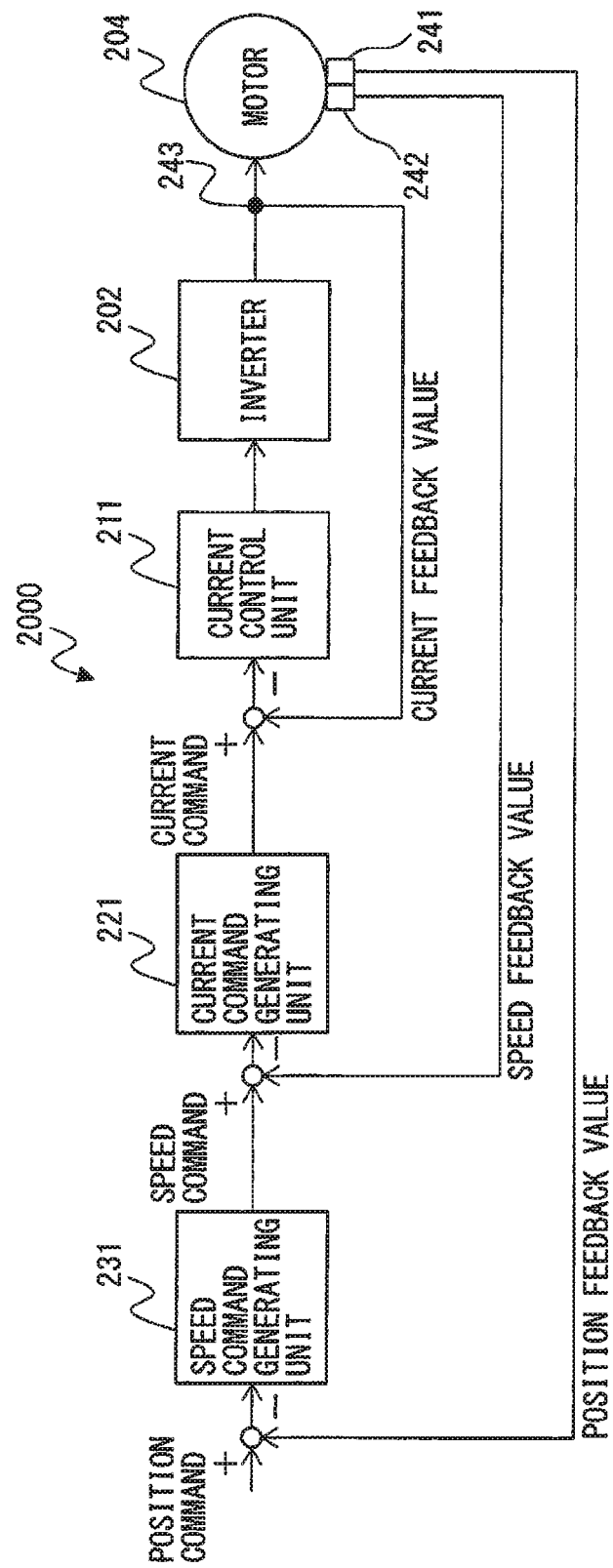
FIG. 12 is a block drawing schematically illustrating a configuration of a common motor driving apparatus.

FIG. 11 is a principle block diagram illustrating a correction value computation apparatus including the machine learning apparatus to which supervised learning is applied, and a motor driving apparatus including the correction value computation apparatus, according to the embodiment. As is clear from comparison between FIG. 11 and FIG. 5 described above, a correction value computation apparatus illustrated in FIG. 11 to which supervised learning is applied and a motor driving apparatus including the correction value computation apparatus further includes a result (label) providing unit 42, in addition to the correction value computation apparatus illustrated in FIG. 5 to which Q learning (reinforcement learning) is applied, and the motor driving apparatus including the correction value computation apparatus. The machine learning apparatus 1 in FIG. 11 includes a state observation unit 11, a learning unit 16 provided with an error computation unit 23 and a learning model update unit 24, and a decision-making unit 17.

In the correction value computation apparatus including the machine learning apparatus illustrated in FIG. 11 to which supervised learning is applied, and the motor driving apparatus including the correction value computation apparatus, the error computation unit 23 and the learning model update unit 24 correspond to the reward computation unit 21 and the function update unit 22, respectively, in the correction value computation apparatus illustrated in FIG. 5 to which Q learning is applied and the motor driving apparatus including the correction value computation apparatus. However, the error computation unit 23 is configured to input a result (label) from the result providing unit 42. Other components are the same as those in FIG. 5 described above, and the description thereof is omitted.

The result providing unit 42 provides (inputs) data with a label (result) to the error computation unit 23 of the learning unit 16; the error computation unit 23 receives the data with the label from the result providing unit 42 and a signal from the state observation unit 11 to perform error computation; and the learning model update unit 24 updates the learning model. For example, when the processes by the motor driving apparatus 1000 are the same, the result providing unit 42 may hold, for example, the data with a label obtained by the day before the predetermined day on which the motor driving apparatus 1000 is driven, and may provide the data with the label held in the result providing unit 42 to the error computation unit 23 on the predetermined day.

Alternatively, it is possible to provide data obtained by simulation or the like performed outside the motor driving apparatus 1000, or data with a label of other motor driving apparatus to the error computation unit 23 of the motor driving apparatus 1000 through a memory card or a communication line. Further, the result providing unit 42 may be configured by a nonvolatile memory, such as a flash memory, the result providing unit (nonvolatile memory) 42 may be embedded in the learning unit 16, and the data with the label held in the result providing unit 42 may be used by the learning unit 16 as it is.

As for the operation of the machine learning apparatus 1 included in the correction value computation apparatus 51 in the motor driving apparatus 1000 illustrated in FIG. 11, in order to acquire the current feedback offset correction value, the inter-current-feedback-phase unbalance correction value, and the current command correction value for a dead zone which minimize the error between the rotor position command and the rotor actual position (improve smoothness of a feed), the error computation unit 23, for example, computes the error on the basis of the smoothness of the feed resulting from a state variable depending on the result input from the result providing unit 42, and updates the learning model in the learning model update unit 24.

Note that the machine learning apparatus 1 in the present invention is not limited to an apparatus to which above-described reinforcement learning (for example, Q learning) or supervised learning is applied, and various types of algorithm for machine learning are applicable.

In the above-described motor driving apparatus 1000, data regarding the temperature in the motor driving apparatus 1000, data regarding the temperature of the three-phase AC motor 104, and data regarding the voltage of each part of the motor driving apparatus 1000 are accumulated as an operation condition of the motor driving apparatus 1000 during the learning processing in the machine learning apparatus 1, and therefore, a function of predictive computation of the temperature in the motor driving apparatus 1000, the temperature of the three-phase AC motor 104, or the voltage of each part of the motor driving apparatus 1000 in the future, from the present operation condition of the motor driving apparatus 1000 on the basis of the accumulated data may be further provided.

The state observation unit 11, the learning units 12, 14, and 16, and the decision-making units 13, 15, and 17 described above may be constructed in, e.g., the software program form or constructed by a combination of various electronic circuits and software programs. When, for example, these units are constructed in the software program form, the function of each of the above-described units is implemented by operating the arithmetic processing unit in the motor driving apparatus 1000 in accordance with the software program. Alternatively, the machine learning apparatus 1 including the state observation unit 11 and the learning units 12, 14 and 16 may be implemented as a semiconductor integrated circuit in which a software program for implementing the function of each unit is written. Or again, a semiconductor integrated circuit in which a software program for implementing the function of each unit is written may be implemented to include the decision-making units 13, 15, and 17, as well as the machine learning apparatus 1 including the state observation unit 11 and the learning units 12, 14 and 16.

Because machine learning processing according to the present invention is performed using data regarding the error between the rotor position command and the rotor actual position acquired by the error measuring unit 36 which is originally provided for drive control of the three-phase AC motor 104 in the motor driving apparatus 1000, data regarding the temperature in the motor driving apparatus 1000 measured by the motor-driving-apparatus temperature measuring unit 37, data regarding the temperature of the three-phase AC motor 104 measured by the motor temperature measuring unit 38, and data regarding the voltage of each part of the motor driving apparatus 1000 detected by the voltage detection unit 40, this involves no new hardware device as in the conventional technique, and this configuration is, therefore, also applicable to an existing motor driving apparatus by retrofitting. In this case, it suffices to equip the existing motor driving apparatus with a semiconductor integrated circuit in which a software program for implementing the function of each unit including the machine learning apparatus 1 and the decision-making units 13, 15, and 17 is written, or to additionally install on the arithmetic processing unit in the existing motor driving apparatus, a software program for implementing the function of each unit including the machine learning apparatus 1 and the decision-making units 13, 15, and 17. Further, a machine learning apparatus 1 having learned the current feedback offset correction value, the inter-current-feedback-phase unbalance correction value, and the current command correction value for a dead zone for a motor driving apparatus may be mounted in another motor driving apparatus to re-learn and update the current feedback offset correction value, the inter-current-feedback-phase unbalance correction value, and the current command correction value for a dead zone for the another motor driving apparatus.

According to the present invention, it is possible to implement a machine learning apparatus and method which can easily minimize the error between the rotor position command to the three-phase AC motor and the rotor actual position, a correction value computation apparatus and a motor driving apparatus including the machine learning apparatus.

According to the present invention, in a state where the motor driving apparatus is operating, the machine learning apparatus learns and adjusts, by itself, the current feedback offset correction value, the inter-current-feedback-phase unbalance correction value, and the current command correction value for a dead zone, which are possible to easily minimize the error between the rotor position command and the rotor actual position, in accordance with ambient environment, such as temperature in the motor driving apparatus, temperature of the three-phase AC motor, and voltage of each part of the motor driving apparatus, and this can change each correction value in real time even when the ambient environment changes, and the error between the rotor position command and the rotor actual position can be minimized appropriately. It is generally known that these correction values have an effect on each other, but according to the present invention, the optimal combination of the correction values can be changed in real time even when ambient environment changes, and therefore the error between the rotor position command and the rotor actual position can be minimized appropriately compared with conventional art not taking into consideration the influence between the correction values.

What is claimed is:

1. A motor driving apparatus with current control based on a current command and a current feedback value in a three-phase AC motor, the motor driving apparatus comprising:
    a state observation unit that observes a state variable including at least one of data regarding an error between a rotor position command to the three-phase AC motor and a rotor actual position of the three-phase AC motor, data regarding temperature in the motor driving apparatus, data regarding temperature of the three-phase AC motor, and data regarding a voltage of the motor driving apparatus;
    a learning unit that learns a current feedback offset correction value used for correcting an offset amount included in the current feedback value, an inter-current-feedback-phase unbalance correction value used for correcting an unbalance between phases in the current feedback value, and a current command correction value for a dead zone used for correcting a current command in order to compensate a decreased amount of current due to a switching dead zone by which switching elements of upper and lower arms in the same phase of an inverter for motor power supply provided in the motor driving apparatus are not simultaneously turned on, in accordance with a training data set defined by the state variable;
    a decision-making unit which decides the current command correction value for a dead zone, on the basis of a result of learning by the learning unit in accordance with the training data set in response to an input of the state variable;
    a current command correction unit for a dead zone which corrects the current command for the three-phase AC motor by using the current command correction value for a dead zone, and generates a corrected current command; and
    a current control unit which controls driving of the three-phase AC motor based on the corrected current command.

2. The motor driving apparatus according to claim 1, wherein the voltage includes at least one of an input AC voltage input into the motor driving apparatus, DC link voltage between a rectifier provided in the motor driving apparatus and rectifying the input AC voltage and the inverter for motor power supply, and control voltage used to drive a control apparatus provided in the motor driving apparatus.

3. The motor driving apparatus according to claim 1, wherein the learning unit comprises:
    a reward computation unit that computes a reward on the basis of the error between the rotor position command to the three-phase AC motor and the rotor actual position of the three-phase AC motor; and
    a function update unit that updates, on the basis of the state variable and the reward, functions for computing the current feedback offset correction value, the inter-current-feedback-phase unbalance correction value, and the current command correction value for a dead zone.

4. The motor driving apparatus according to claim 1, wherein the learning unit is configured to learn the current feedback offset correction value, the inter-current-feedback-phase unbalance correction value, and the current command correction value for a dead zone in accordance with the training data set obtained for a plurality of motor driving apparatuses.

5. The motor driving apparatus according to claim 1, wherein
    the decision-making unit decides the current feedback offset correction value, the inter-current-feedback-phase unbalance correction value, and the current command correction value for a dead zone, on the basis of the result of learning by the learning unit in accordance with the training data set in response to the input of the state variable.

6. The motor driving apparatus according to claim 3, wherein the reward computation unit increases the reward when the error between the rotor position command to the three-phase AC motor and the rotor actual position of the three-phase AC motor is within a specified range, and the reward computation unit decreases the reward when the error is outside the specified range.

7. The motor driving apparatus according to claim 3, wherein the reward computation unit computes the reward on the basis of a result obtained by performing fast fourier transform on the error between the rotor position command to the three-phase AC motor and the rotor actual position of the three-phase AC motor.

8. The motor driving apparatus according to claim 3, wherein the function update unit updates the functions for computing the current feedback offset correction value, the inter-current-feedback-phase unbalance correction value, and the current command correction value for a dead zone, on the basis of the state variable and the reward in accordance with a neural network model.

9. The motor driving apparatus according to claim 7, wherein the function update unit updates functions for computing the current feedback offset correction value, the inter-current-feedback-phase unbalance correction value, and the current command correction value for a dead zone, on the basis of the reward and the error between the rotor position command and the rotor actual position on which the fast fourier transform is performed.

10. A motor driving apparatus, comprising:
a correction value computation apparatus for current control in the motor driving apparatus, the correction value computation apparatus comprising:
a machine learning apparatus that learns correction values associated with the current control based on a current command and a current feedback value in the motor driving apparatus for a three-phase AC motor, the machine learning apparatus comprising:
a state observation unit that observes a state variable including at least one of data regarding an error between a rotor position command to the three-phase AC motor and a rotor actual position of the three-phase AC motor, data regarding temperature in the motor driving apparatus, data regarding temperature of the three-phase AC motor, and data regarding a voltage of the motor driving apparatus; and
a learning unit that learns a current feedback offset correction value used for correcting an offset amount included in the current feedback value, an inter-current-feedback-phase unbalance correction value used for correcting an unbalance between phases in the current feedback value, and a current command correction value for a dead zone used for correcting a current command in order to compensate a decreased amount of current due to a switching dead zone by which switching elements of upper and lower arms in the same phase of an inverter for motor power supply provided in the motor driving apparatus are not simultaneously turned on, in accordance with a training data set defined by the state variable; and
a decision-making unit which decides the current feedback offset correction value, the inter-current-feedback-phase unbalance correction value, and the current command correction value for a dead zone, on the basis of a result of learning by the learning unit in accordance with the training data set in response to an input of the state variable;
the motor driving apparatus further comprising:
a rectifier which rectifies input AC voltage input from an AC power supply side, and outputs DC voltage to the DC link side;
the inverter for motor power supply which is connected to the rectifier through the DC link, and converts the DC voltage on the DC link side into AC voltage by ON/OFF driving of an internal switching element to output the AC voltage to the three-phase AC motor side;
a current detection unit which detects current flowing into the three-phase AC motor from the inverter for motor power supply to output the current as the current feedback value;
a current feedback offset correction unit which corrects the offset amount included in the current feedback value using the current feedback offset correction value;
an inter-current-feedback-phase unbalance correction unit which corrects the unbalance between phases in the current feedback value using the inter-current-feedback-phase unbalance correction value;
a current command correction unit for a dead zone which corrects the current command so as to compensate a decreased amount of current due to a switching dead zone by which switching elements of upper and lower arms in the same phase of the inverter for motor power supply are not simultaneously turned on, by using the current command correction value for a dead zone;
a position detection unit which detects the rotor actual position of the three-phase AC motor;
an error measuring unit which measures the error between the rotor position command to the three-phase AC motor and the rotor actual position;
a motor-driving-apparatus temperature measuring unit which measures the temperature in the motor driving apparatus;
a motor temperature measuring unit which measures the temperature of the three-phase AC motor;
a current control unit which controls a switching operation of the switching elements of the inverter for motor power supply so that the current command is equal to the current feedback value; and
a voltage detection unit which detects at least one of the input AC voltage input into the motor driving apparatus, the DC link voltage between the rectifier and the inverter for motor power supply, and the control voltage used to drive a control device including the current control unit provided in the motor driving apparatus.

11. A motor driving method with current control based on a current command and a current feedback value in a motor driving apparatus for a three-phase AC motor, the motor driving method comprising:
observing a state variable including at least one of data regarding an error between a rotor position command to the three-phase AC motor and a rotor actual position of the three-phase AC motor, data regarding temperature in the motor driving apparatus, data regarding temperature of the three-phase AC motor, and data regarding a voltage of the motor driving apparatus;
learning a current feedback offset correction value used for correcting an offset amount included in the current feedback value, an inter-current-feedback-phase unbalance correction value used for correcting an unbalance between phases in the current feedback value, and a current command correction value for a dead zone used for correcting a current command in order to compensate a decreased amount of current due to a switching dead zone by which switching elements of upper and lower arms in the same phase of an inverter for motor power supply provided in the motor driving apparatus are not simultaneously turned on, in accordance with a training data set defined by the state variable;
deciding the current command correction value for a dead zone, on the basis of a result of learning by the learning unit in accordance with the training data set in response to an input of the state variable;
correcting the current command for the three-phase AC motor by using the current command correction value for a dead zone to generate a corrected current command; and
controlling driving of the three-phase AC motor based on the corrected current command.

* * * * *